United States Patent
Rabii et al.

(10) Patent No.: US 8,078,622 B2
(45) Date of Patent: Dec. 13, 2011

(54) REMOTE VOLUME ACCESS AND MIGRATION VIA A CLUSTERED SERVER NAMESPACE

(75) Inventors: Faramarz Rabii, Ashland, MA (US); Hooman Vassef, Arlington, MA (US); Peter Corbett, Lexington, MA (US); Keith Arner, Cranberry Township, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 536 days.

(21) Appl. No.: 12/261,369

(22) Filed: Oct. 30, 2008

(65) Prior Publication Data

US 2010/0114889 A1    May 6, 2010

(51) Int. Cl.
*G06F 17/30* (2006.01)
(52) U.S. Cl. ........ 707/737; 707/704; 707/707; 707/769; 707/809
(58) Field of Classification Search .................. 707/704, 707/707, 737, 769, 809
See application file for complete search history.

(56) References Cited

U.S. PATENT DOCUMENTS

| | | | |
|---|---|---|---|
| 5,568,629 A | 10/1996 | Gentry et al. | |
| 5,889,934 A | 3/1999 | Peterson | |
| 6,421,684 B1 * | 7/2002 | Cabrera et al. | 707/802 |
| 7,127,577 B2 | 10/2006 | Koning et al. | |
| 7,237,021 B2 | 6/2007 | Penny et al. | |
| 7,269,696 B2 | 9/2007 | Muhlestein et al. | |
| 7,284,030 B2 | 10/2007 | Ackaouy et al. | |
| 7,340,486 B1 | 3/2008 | Chapman | |
| 7,340,639 B1 | 3/2008 | Lee et al. | |
| 2002/0083118 A1 * | 6/2002 | Sim | 709/105 |
| 2006/0248379 A1 | 11/2006 | Jernigan | |
| 2007/0088702 A1 | 4/2007 | Fridella et al. | |
| 2007/0103984 A1 * | 5/2007 | Kavuri et al. | 365/185.17 |
| 2007/0260609 A1 * | 11/2007 | Tulyani | 707/10 |
| 2008/0154988 A1 * | 6/2008 | Shiozawa et al. | 707/204 |
| 2009/0210431 A1 * | 8/2009 | Marinkovic et al. | 707/10 |

OTHER PUBLICATIONS

Data ONTAP GX: A Scalable Storage Cluster Copyright © 2006 Michael Eisler, Peter Corbett, Michael Kazar, Daniel S. Nydick, J. Christopher Wagner.

* cited by examiner

*Primary Examiner* — Shahid Alam
*Assistant Examiner* — Andalib Lodhi
(74) *Attorney, Agent, or Firm* — Blakely, Sokoloff, Taylor & Zafman LLP

(57) ABSTRACT

A system and method that provides users of network data storage systems with the ability to gain the advantages of a clustered storage server system, in which volumes stored on multiple server nodes are linked into a virtual global hierarchical namespace, without first having to migrate their data to the clustered storage server system. The system employs an extended virtual global hierarchical namespace that allows client systems to access, via the extended global namespace, volumes stored on the clustered storage server system and on one or more storage servers that are remote from and do not constitute a part of the clustered system. The extended global namespace can also be employed to perform migration of volume data among the multiple nodes of the clustered storage server system and the remote storage servers.

57 Claims, 16 Drawing Sheets

REMOTE VOLUME ACCESS AND MIGRATION VIA A CLUSTERED SERVER NAMESPACE

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present invention relates generally to network data storage systems, and more specifically to systems and methods of extending the namespace of a clustered network data storage system to allow access to and migration of volumes stored on one or more remote network data storage systems.

BACKGROUND OF THE INVENTION

As computer networks have become faster and more reliable, the deployment of network data storage systems in enterprise computing environments has become more widespread. In a typical enterprise computing environment, client systems such as computer workstations, database servers, web servers, and other application servers can access data stored remotely from the client systems, typically in one or more central locations. One or more computer networks, e.g., one or more local area networks (LANs) or wide area networks (WANs), connect the client systems to mass storage devices such as disks disposed at the central locations. Such centralized data storage, referred to hereinafter as "network data storage", facilitates the sharing of data among many geographically distributed client systems. Network data storage also enables information systems (IS) departments to use highly reliable (sometimes redundant) computer equipment to store their data.

In the typical network data storage environment, specialized computers such as file servers, storage servers, storage appliances, etc. (referred to hereinafter as "storage servers") located at the central locations make the data stored on the disks available to the client systems. Each storage server typically has a monolithic architecture, in which network and data components are contained within a single device. Software running on the storage servers and other software running on the client systems communicate according to well-known protocols such as the Network File System (NFS) protocol and the Common Internet File System (CIFS) protocol to make the data stored on the disks appear to users and application programs as though the data were stored locally on the client systems. Each storage server makes data available to the client systems by presenting or exporting one or more volumes, or one or more sub-volume units referred to herein as "qtrees", to the client systems. Each volume is configured to store data files, scripts, word processing documents, executable programs, and the like. From the perspective of a client system, each volume can appear to be a single disk drive. However, each volume can represent the storage space in a single storage device, a redundant array of independent disks (RAID) or a RAID group, an aggregate of some or all of the storage space in a set of storage devices, or any other suitable set of storage space.

Specifically, each volume can include a number of individually addressable files. For example, in a network attached storage (NAS) configuration, the files of a volume are addressable over a computer network for file-based access. Each volume may be composed of all or a portion of the storage available on a single disk or on multiple disks. In addition, an aggregate is a fixed-sized volume built on top of a number of RAID groups which contain other volumes referred to herein as "virtual volumes" or "FlexVol® flexible volumes". An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

In a typical mode of operation, a client system transmits one or more input/output commands such as a request for data over a network to a storage server or a virtual storage server, which receives the request, issues one or more I/O commands to the appropriate disk(s) to read or write the data on behalf of the client system, and issues a response containing the requested data to the client system. It should be understood that a storage server can be partitioned into a number of virtual storage servers for administrative purposes. Further, a fixed-sized volume (i.e., an aggregate) can be partitioned into a number of virtual or flexible volumes. Any suitable combination of storage servers and volumes is possible, such as a storage server with fixed-sized volumes, a storage server with virtual or flexible volumes built on aggregates, a virtual storage server with fixed-sized volumes, and a virtual storage server with virtual or flexible volumes.

Multiple storage servers can be arranged in a cluster configuration to form a single storage server system. Such a clustered storage server system has a distributed architecture that includes a plurality of server nodes interconnected by a switching fabric. Each server node typically includes a network module (an N-module), a disk module (a D-module), and a management module (an M-host). The N-module provides functionality that enables a respective node within the clustered system to connect to a client system over a computer network, the D-module provides functionality enabling the respective node to connect to one or more disks, and the M-host provides management functions for the clustered system. A switched virtualization layer is provided below the interface between the N-module and the client system(s), allowing the disks associated with the multiple nodes in the cluster configuration to be presented to the client system(s) as a single shared storage pool. In a typical mode of operation, a client system transmits an NFS or CIFS request for data to one of the server nodes within the clustered system. The request typically includes a file handle for a data file stored in a specified volume. The N-module within the node that received the request extracts a volume identifier from the file handle, and uses the volume identifier to index a volume location database (VLDB) to obtain an identification of the aggregate storing the specified volume. The N-module then uses the aggregate identification to locate the D-module responsible for the aggregate, and transmits a request to the D-module for the data on the specified volume using an internal protocol. The D-module executes the request, and transmits, using the internal protocol, a response containing the requested volume data back to the N-module, which in turn transmits an NFS or CIFS response with the requested data to the client system. In this way, the N-modules can export, to one or more client systems, one or more volumes that are stored on aggregates accessible via the D-modules.

The clustered storage server system with the distributed architecture has a number of advantages over the traditional storage server with the monolithic architecture. For example, the clustered storage server system provides horizontal scalability, allowing one or more server nodes to be added to the clustered system as the number of client systems connected to the network increases. Further, the clustered system allows for the migration of network virtual interfaces (VIFs) and the migration of volume data among the multiple server nodes, and provides load sharing for mirrors of volumes. Moreover, in the clustered system, the names of the volumes from the multiple server nodes can be linked into a virtual global hierarchical namespace, allowing the client systems to mount the volumes from the various server nodes with increased flexibility. In addition, in the clustered system, if one of the server nodes fails, then another one of the server nodes can assume the tasks of processing and handling any data requests normally processed by the node that failed, thereby providing an effective failover mechanism.

For at least the reasons discussed above, IS departments are increasingly transitioning from traditional monolithic storage servers to distributed storage server systems to satisfy their network data storage needs. It would be desirable, however, to provide users of network data storage systems with the ability to gain the advantages of clustered storage server systems during the transition period from traditional storage servers to distributed storage server systems, without first having to migrate their data from the traditional storage servers to the distributed storage server systems.

BRIEF SUMMARY OF THE INVENTION

In accordance with the present invention, a system and method is disclosed that provides users of network data storage systems with the ability to gain the advantages of a clustered storage server system, in which volumes stored on multiple server nodes are linked into a virtual global hierarchical namespace, without first having to migrate their data to the clustered system.

As used herein, the term "namespace" refers to a virtual hierarchical collection of unique volume names or identifiers and directory paths to the volumes, in which each volume represents a virtualized container storing a portion of the namespace descending from a single root directory. For example, each volume associated with a namespace can be configured to store one or more data files, scripts, word processing documents, executable programs, etc. In a typical storage server system, the names or identifiers of the volumes stored on a storage server can be linked into a namespace for that storage server. In addition, as used herein, a "global namespace" refers to a virtual hierarchical collection of unique volume names or identifiers and directory paths to the volumes, in which the volumes are stored on multiple server nodes within a clustered storage server system. In the context of the present invention, the global namespace of a clustered storage server system can be extended to include not only the identifiers of volumes stored on the multiple server nodes of the clustered system, but also the identifiers of volumes stored on one or more storage server systems that are remote from and do not constitute a part of the clustered system.

In one embodiment, volumes are linked together in such an extended global namespace through "junctions". A junction is an internal mount point which, to a client, resolves to a directory (which would be the root directory of the target volume). From the perspective of a client system, a junction appears as a normal directory in the namespace exported by the clustered storage server system.

By extending the global namespace of a clustered storage server system to include both volumes stored on the clustered system and volumes stored on one or more storage server systems that are remote from the clustered system, client systems can access the volumes of the remote systems through the extended global namespace of the clustered system, thereby allowing the client systems to gain the advantages of the clustered system without first having to migrate their data from the remote storage server systems to the clustered system. Such advantages include horizontal scalability, the ability to transparently migrate volume data among the multiple server nodes of the clustered system and the remote storage server systems, and the ability to provide load sharing for mirrors of volumes.

In one exemplary embodiment, a method of accessing data on a volume of a remote storage server via an extended global namespace of volumes of a cluster of storage servers is provided. Each of the volumes of the cluster of storage servers and the remote storage server is linked into the extended global namespace via a junction corresponding to an internal mount point in the global namespace for the respective volume. It is noted that a junction can point to either local or remote volumes. A junction points to a set of one or more volumes, each identified by a Data Set Identifier (DSID), which identifies either a local or remote volume. A request from a client regarding data on a volume of the remote storage server is received at one of the storage servers of the cluster of storage servers. The client request includes a volume identifier for the respective remote storage server volume. At least one database is queried by the storage server within the cluster of storage servers using the volume identifier for the remote storage server volume, thereby obtaining location information for the remote storage server volume. The location information is associated with the internal mount point in the extended global namespace for the remote storage server volume. The remote storage server volume is located using the location information obtained from the database, and data associated with the located remote storage server volume is subsequently accessed.

In another exemplary embodiment, a method of tracking lock information pertaining to a number of lock requests issued by a client to access one or more corresponding data storage entities is provided. The data storage entities are stored on one or more storage servers within a network data storage environment including a plurality of storage servers. A lock request is received by a first storage server from the client to access a corresponding data storage entity, in which the corresponding data storage entity is stored on a second storage server. The lock request is forwarded to the second storage server by the first storage server to obtain the requested lock on the corresponding data storage entity. A lock is then obtained by the first storage server on a corresponding shadow data storage entity, in which the shadow data storage entity is representative of the data storage entity stored on the second storage server. Next, lock information pertaining to the lock on the corresponding shadow data storage entity is stored by the first storage server. The stored lock information includes an identifier for the client obtaining the lock on the data storage entity, and an identifier for the data storage entity itself. A notify request is then received from the second storage server at the first storage server. The notify request pertains to at least one data storage entity stored on the second storage server for which the client obtained a lock. In response to the receipt of the notify request, the stored lock information is consulted to identify the data storage entity stored on the second storage server for which the client obtained the lock, and to identify the client that obtained the lock on that data storage entity. The lock on the corresponding shadow data storage entity is then released, and a notify request is transmitted to the identified client.

In still another exemplary embodiment, a method of migrating data from a source volume of a source storage server to a destination volume of a destination storage server is provided for use in a network data storage system including a cluster of storage servers and at least one remote storage server. The migration of the data is begun by copying a first portion of the data from the source volume of the source storage server to the destination volume of the destination storage server. One or both of the source storage server and the destination storage server can correspond to the remote storage server. In the event a predetermined remaining portion of the data has not yet been copied from the source volume to the destination volume, client access to the source storage server is paused. While the client access to the source storage server is paused, the migration of the data is completed by copying the predetermined remaining portion of the data from the source volume to the destination volume. A global namespace of volumes of the cluster of storage servers is then modified to allow access to the migrated data on the destination volume via the modified global namespace.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

A system and method is disclosed that provides users of network data storage systems with the ability to gain the advantages of a clustered storage server system, in which volumes stored on multiple server nodes are linked into a virtual global hierarchical namespace, without first having to migrate their data to the clustered storage server system. The presently disclosed system and method extends the global namespace of the clustered storage server system to allow access, via the extended global namespace, to volumes stored on one or more storage servers that are remote from and do not constitute a part of the clustered system. The extended global namespace can also be employed to perform transparent migration of volume data among the multiple nodes of the clustered storage server system and the remote storage servers.

A. Storage Server System Including at Least One Storage Server

Figure 1:
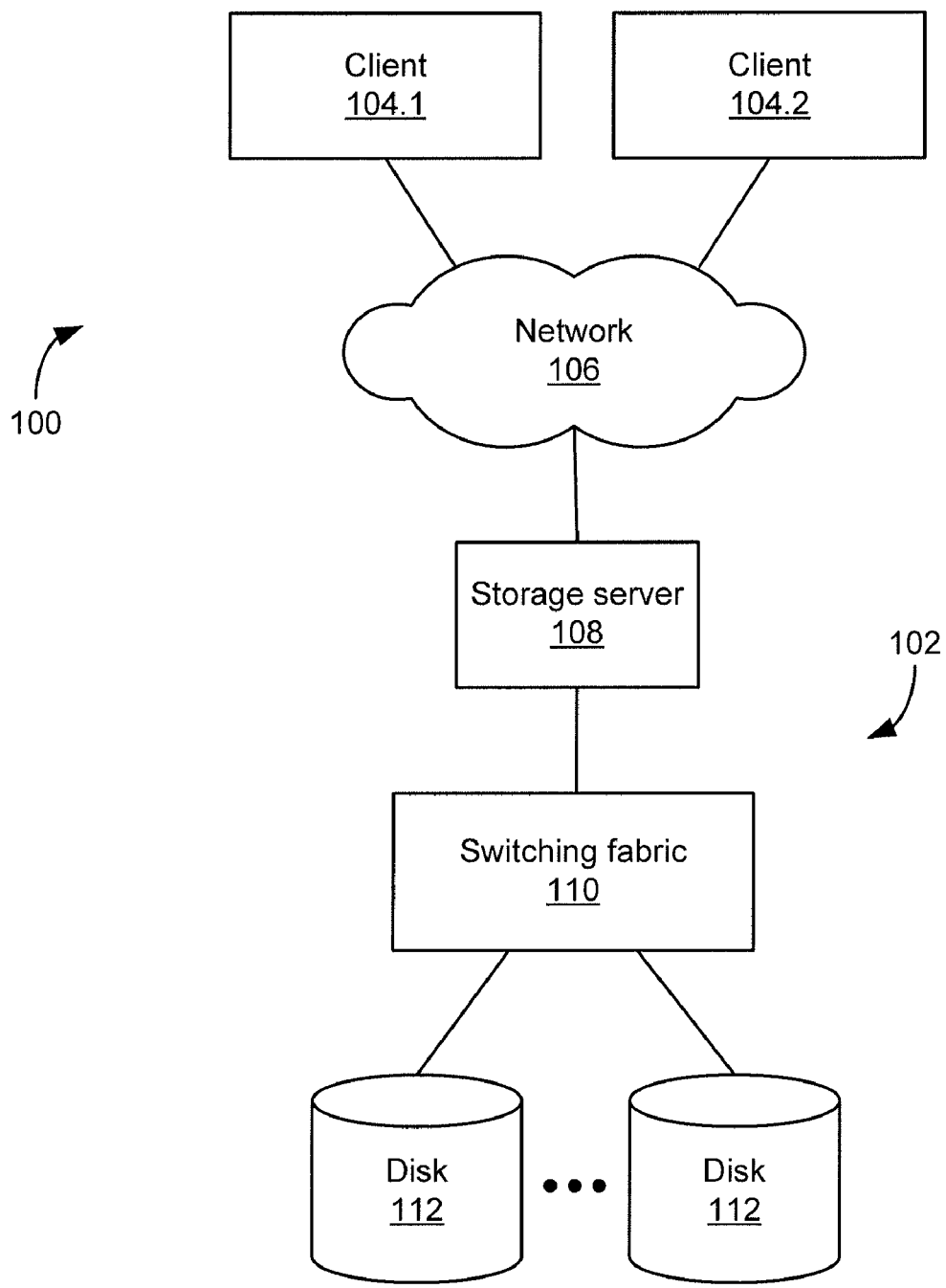
FIG. 1 is a block diagram of a storage server deployed in a typical computing environment.

FIG. 1 depicts an illustrative embodiment of a typical network data storage environment 100, including a plurality of client systems 104.1-104.2, a storage server system 102, and at least one computer network 106 communicably connecting the client systems 104.1-104.2 and the storage server system 102. As shown in FIG. 1, the storage server system 102 includes a storage server 108, a switching fabric 110, and at least one mass storage device such as a disk 112. For example, storage servers like the storage server 108 are available from NetApp, Inc., Sunnyvale, Calif., USA. The client systems 104.1-104.2 are connected to the storage server 108 via the computer network 106, such as a packet-switched network. Further, the storage server 108 is connected to the disk 112 via the switching fabric 110, such as a fiber distributed data interface (FDDI) network. It is noted that, within the network data storage environment 100, any other suitable numbers of storage servers and/or mass storage devices, and/or any other suitable network technologies, may be employed.

By way of background, the storage server 108 can make some or all of the storage space on the disk(s) 112 available to the client systems 104.1-104.2 in a conventional manner. For example, the disk(s) 112 can be implemented as an individual disk, several disks, a redundant array of independent disks (commonly referred to as a "RAID group"), or any other suitable mass storage device(s). Software running on the storage server 108 and other software running on the client systems 104.1-104.2 communicate according to well-known protocols, such as the Network File System (NFS) protocol or the Common Internet File System (CIFS) protocol, to make data stored on the disk 112 appear to users and/or application programs as though the data were stored locally on the client systems 104.1-104.2. The storage server 108 can present or export data stored on the disk 112 as a volume, or one or more qtree sub-volume units, to each of the client systems 104.1-104.2. Each volume is configured to store data files, scripts, word processing documents, executable programs, and the like. For example, the storage server 108 can include the NETAPP® DATA ONTAP® storage operating system, available from NetApp, Inc., that implements a Write Anywhere File Layout (WAFL®) storage system, or any other suitable storage operating system. From the perspective of one of the client systems 104.1-104.2, each volume can appear to be a single disk drive. However, each volume can represent the storage space in one disk, an aggregate of some or all of the storage space in multiple disks, a RAID group, or any other suitable set of storage space.

Specifically, each volume can include a number of individually addressable files. For example, in a network attached storage (NAS) configuration, the files of a volume are addressable over the computer network 106 for file-based access. In addition, an aggregate is a fixed-sized volume built on top of a number of RAID groups containing one or more virtual volumes or FlexVol® flexible volumes. An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

In a typical mode of operation, one of the client systems 104.1-104.2 transmits one or more input/output commands, such as an NFS or CIFS request, over the computer network 106 to the storage server 108 or a virtual storage server hosted by the storage server 108, which receives the request, issues one or more I/O commands over the switching fabric 110 to the disk 112 to read or write the data on behalf of the client system 104.1-104.2, and issues an NFS or CIFS response containing the requested data over the network 106 to the respective client system. It should be appreciated that the storage server 108 can be partitioned into a number of virtual storage servers for administrative purposes. Further, a fixed-sized volume (i.e., an aggregate) can be partitioned into a number of virtual or flexible volumes. Any suitable combination of storage servers, virtual storage servers, and volumes is possible, such as the storage server 108 with fixed-sized volumes, the storage server 108 with virtual or flexible volumes built on aggregates, a virtual storage server hosted by the storage server 108 with fixed-sized volumes, and a virtual storage server hosted by the storage server 108 with virtual or flexible volumes. It is noted that a client system can request a lock when requesting access to a file. Such a lock is an abstraction representing the right, either shared or exclusive, to access a particular range of the file or another shared resource. For example, locks for NFS versions 2 and 3 can be obtained using the Network Lock Manager (NLM) file locking protocol, as described below in section D.

B. Clustered Storage Server System

Figure 2:
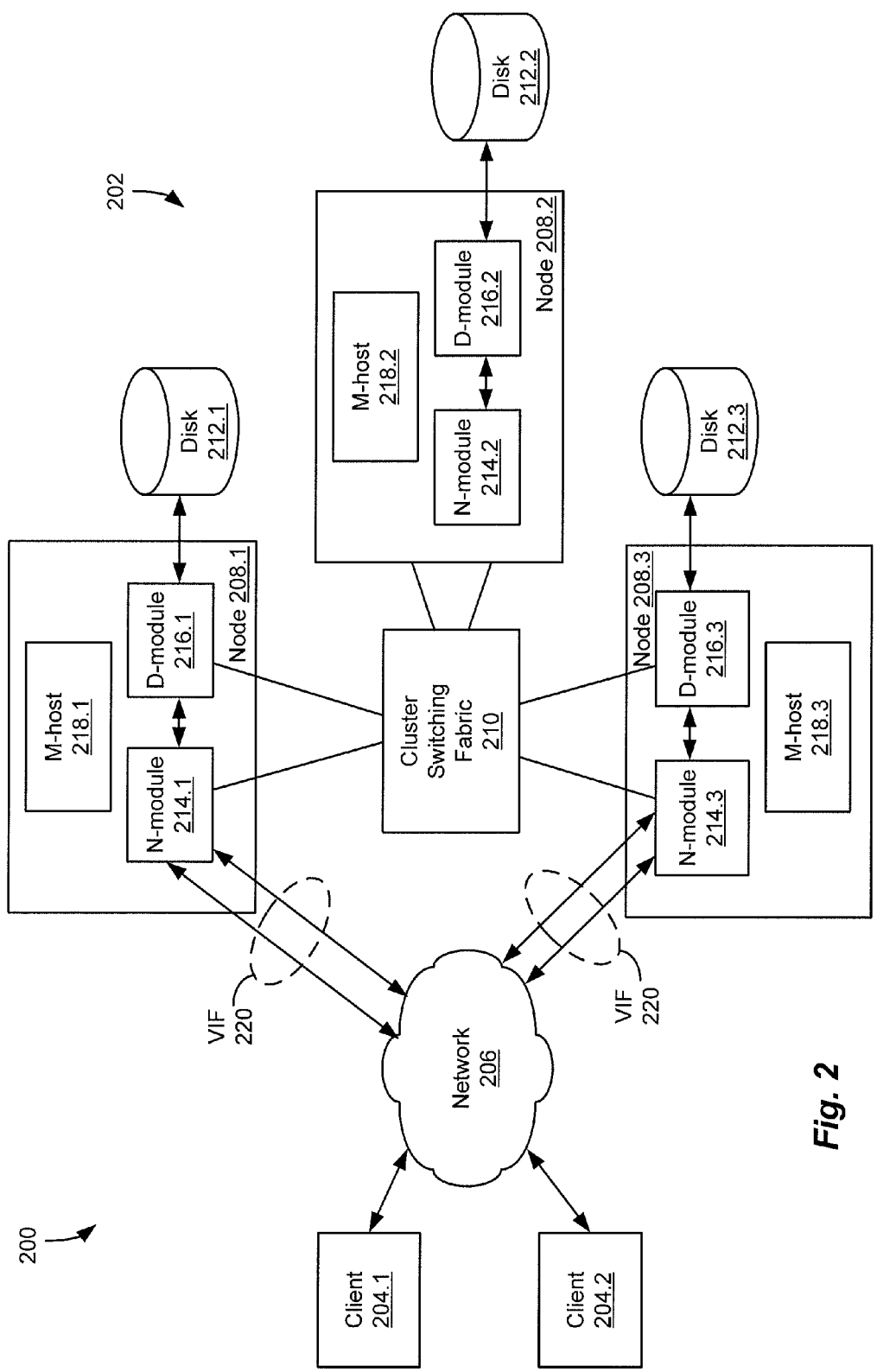
FIG. 2 is a block diagram of a clustered storage server system including a plurality of server nodes.

FIG. 2 depicts an illustrative embodiment of a network data storage environment 200, including a plurality of client systems 204.1-204.2, a clustered storage server system 202, and at least one computer network 206 communicably connecting the client systems 204.1-204.2 and the clustered storage server system 202. As shown in FIG. 2, the clustered storage server system 202 includes a plurality of server nodes 208.1-208.3, a cluster switching fabric 210, and a plurality of mass storage devices such as disks 212.1-212.3. For example, clustered storage server systems like the clustered storage server system 202 are available from NetApp, Inc. Each of the plurality of nodes 208.1-208.3 is configured to include an N-module, a D-module, and an M-host, each of which can be implemented as a separate software module. Specifically, the node 208.1 includes an N-module 214.1, a D-module 216.1, and an M-host 218.1, the node 208.2 includes an N-module 214.2, a D-module 216.2, and an M-host 218.2, and the node 208.3 includes an N-module 214.3, a D-module 216.3, and an M-host 218.3. The N-modules 214.1-214.3 include functionality that enables the respective nodes 208.1-208.3 to connect to one or more of the client systems 204.1-204.2 over the computer network 206, while the D-modules 216.1-216.3 connect to one or more of the disks 212.1-212.3. The M-hosts 218.1-218.3 provide management functions for the clustered storage server system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the client systems 204.1-204.2, allowing the disks 212.1-212.3 associated with the nodes 208.1-208.3 to be presented to the client systems 204.1-204.2 as a single shared storage pool. For example, the switched virtualization layer may implement a virtual interface architecture. Such virtual interfaces are described in the DATA ONTAP® 6.1 SYSTEM ADMINISTRATOR'S GUIDE, the contents of which are hereby incorporated herein by reference in its entirety. FIG. 2 depicts only the VIFs 220 at the interfaces to the N-modules 214.1, 214.3 for clarity of illustration.

It is noted that the clustered storage server system 202 can be organized into any suitable number of virtual servers (vservers), in which each vserver represents a single storage system namespace with separate network access. Each vserver has a user domain and a security domain that are separate from the user and security domains of other vservers. Moreover, each vserver is associated with one or more VIFs and can span one or more physical nodes, each of which can hold one or more VIFs and storage associated with one or more vservers. Client systems can access the data on a vserver from any node of the clustered system, but only through the VIFs associated with that vserver.

Each of the nodes 208.1-208.3 is defined as a computer adapted to provide application services to one or more of the client systems 204.1-204.2. In this context, a vserver is an instance of an application service provided to a client system. The nodes 208.1-208.3 are interconnected by the switching fabric 210, which, for example, may be embodied as a Gigabit Ethernet switch. Although FIG. 2 depicts an equal number (i.e., 3) of the N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage server system 202. For example, in alternative embodiments, the clustered storage server system 202 may include a plurality of N-modules and a plurality of D-modules interconnected in a configuration that does not reflect a one-to-one correspondence between the N-modules and D-modules. The clustered storage server system 202 can include the NETAPP® DATA ONTAP® storage operating system, available from NetApp, Inc., that implements the WAFL® storage system, or any other suitable storage operating system.

The client systems 204.1-204.2 of FIG. 2 may be implemented as general-purpose computers configured to interact with the respective nodes 208.1-208.3 in accordance with a client/server model of information delivery. In the presently disclosed embodiment, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the Network File System (NFS) protocol or the Common Internet File System (CIFS) protocol, when accessing information in the form of files and directories.

In a typical mode of operation, one of the client systems 204.1-204.2 transmits an NFS or CIFS request for data to one of the nodes 208.1-208.3 within the clustered storage server system 202, and the VIF 220 associated with the respective node receives the client request. It is noted that each VIF 220 within the clustered system 202 is a network endpoint having an associated IP address, and that each VIF can migrate from N-module to N-module. The client request typically includes a file handle for a data file stored in a specified volume on one or more of the disks 212.1-212.3. Specifically, each volume comprises a storage system subtree that includes an index node file (an inode file) having a root inode, and a set of directories and files contained under the root inode. Each inode is a data structure allocated for a respective data file to store metadata that describes the data file. For example, an inode can contain data and pointers for use in facilitating access to blocks of data within the data file, and each root inode can contain pointers to a number of inodes. In addition, an aggregate is a fixed-sized volume built on top of a number of RAID groups containing one or more virtual volumes or FlexVol® flexible volumes. An aggregate is therefore a container for virtual or flexible volumes. Accordingly, there are generally two types of volumes, i.e., traditional volumes that are built directly on top of RAID groups, and virtual or flexible volumes that are built on aggregates, which in turn are built on top of RAID groups, which in turn are built on top of whole drives.

Figure 3A:
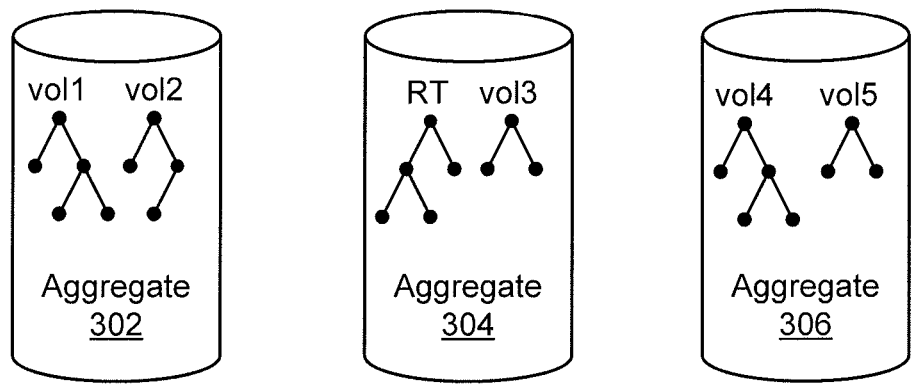
FIG. 3a is a diagram illustrating three aggregates included in the clustered storage server system of FIG. 2.

FIG. 3*a* depicts three exemplary aggregates 302, 304, 306, which can be stored on one or more of the disks 212.1-212.3 of the clustered storage server system 202 (see FIG. 2). As shown in FIG. 3*a*, each of the aggregates 302, 304, 306 contains two representative volumes, in which each volume comprises a storage system subtree. Specifically, the aggregate 302 contains two volumes vol1, vol2, the aggregate 304 contains two volumes RT, vol3, and the aggregate 306 contains two volumes vol4, vol5. In the clustered storage server system 202, the names of the volumes from the plurality of nodes 208.1-208.3 are linked into a virtual global hierarchical namespace, allowing the client systems 204.1-204.2 to mount the volumes from various ones of the nodes 208.1-208.3 with a high level of flexibility.

Figure 3B:
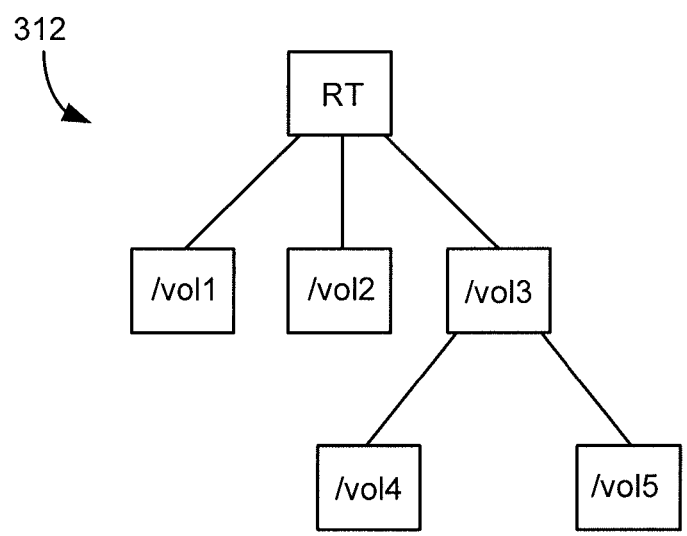
FIG. 3b is a diagram illustrating a virtual global hierarchical namespace composed of a plurality of volumes stored on the clustered storage server system of FIG. 2.

FIG. 3*b* depicts an exemplary global namespace 312 composed of the volumes RT, vol1, vol2, vol3, vol4, vol5. In the global namespace 312, each volume RT, vol1-vol5 represents a virtualized container storing a portion of the global namespace 312 descending from a single root directory. The volumes RT, vol1-vol5 are linked together in the global namespace 312 through a number of junctions. A junction is an internal mount point which, to a client, resolves to a directory (which would be the root directory of the target volume). Such a junction can appear anywhere in a volume, and can link a volume to the root directory of another volume. For example, in the clustered system 202, a junction in the volume vol3 associated with the D-module 216.2 links that volume to the root directory of the volume vol4, which is associated with the D-module 216.3. A junction can therefore link a volume on one of the D-modules 216.1-216.3 to another volume on a different one of the D-modules 216.1-216.3. As shown in FIG. 3*b*, the global namespace 312 includes the volume RT (i.e., the root volume), which has three junctions linking the volume RT to the volumes vol1, vol2, vol3. The global namespace 312 further includes the volume vol3, which has two junctions linking the volume vol3 to the volumes vol4, vol5.

The use of junctions for linking together multiple volumes in a global namespace of a clustered storage server system is further described in U.S. patent application Ser. No. 11/499,493 filed Aug. 4, 2006 entitled ENABLING A CLUSTERED NAMESPACE WITH REDIRECTION, U.S. patent application Ser. No. 12/129,904 filed May 30, 2008 entitled PROVIDING AN ADMINISTRATIVE PATH FOR ACCESSING A WRITEABLE MASTER STORAGE VOLUME IN A MIRRORED STORAGE ENVIRONMENT, and U.S. patent application Ser. No. 11/680,255 filed Feb. 28, 2007 entitled SYSTEM AND METHOD FOR ENABLING A DATA CONTAINER TO APPEAR IN A PLURALITY OF LOCATIONS IN A SUPER-NAMESPACE, each of which is assigned to and commonly owned by the same assignee as the present invention, and each of which is hereby incorporated herein by reference in its entirety. In the context of the present invention, a global namespace of a clustered network data storage system is extended to include not only the volumes stored on the clustered system, but also the volumes of one or more remote network data storage systems, which are not part of the clustered system.

As discussed above, one of the client systems 204.1-204.2 (see FIG. 2) transmits a client request, such as an NFS or CIFS request, for data on a target volume to one of the nodes 208.1-208.3 within the clustered storage server system 202, and the VIF 220 associated with the respective node receives the client request. The N-module included in that node then processes the client request, translating the request into a Remote Procedure Call (RPC) using an internal protocol, such as the SpinNP protocol available from NetApp, Inc. Next, the N-module transmits the SpinNP RPC over the cluster switching fabric 210 to the node that includes the D-module associated with the target volume. To that end, the N-module accesses a volume location database (VLDB), which is a database stored on each of the plurality of nodes 208.1-208.3 that tracks the identities of the aggregates containing the volumes from the plurality of nodes, and the identities of the D-modules associated with the respective aggregates. The N-module consults the VLDB to obtain the identity and location of the D-module to which the SpinNP RPC is to be transmitted. Upon receipt of the SpinNP RPC, the D-module of the node responsible for the target volume processes the RPC.

For example, in the event the client system 204.1 transmits, to the node 208.1, an NFS or CIFS request including a file handle for a data file stored on the volume vol4, the N-module 214.1 on the node 208.1 extracts the file handle from the request, and extracts a first identifier, namely, a Master Data Set Identifier (MSID), of the volume vol4 from the file handle. Each MSID specifies a volume or a set of mirrors of the same volume. Next, the N-module 214.1 uses the MSID of the volume vol4 to index into a volume table contained in the VLDB, which maps the MSID into a second identifier of the volume vol4, namely, a Data Set Identifier (DSID). Each DSID uniquely specifies a copy of a single volume. The N-module 214.1 then uses the DSID of the volume vol4 to lookup the IP address of the D-module 216.3 associated with the aggregate 306 storing the volume vol4, and transmits an internal SpinNP request including an internal file handle with the DSID of the volume vol4 to that IP address. Next, the D-module 216.3 extracts the file handle from the SpinNP request, and, using the DSID, accesses the requested data file on the volume vol4 stored on the aggregate 306. The D-module 216.3 then transmits an internal SpinNP response containing the requested data to the N-module 208.1, which, in turn, transmits an NFS or CIFS response containing the requested data to the client system. It is noted that the client system can request a lock when requesting access to a file. Such locks for NFS versions 2 and 3 can be obtained using the NLM file locking protocol, as described below in section D.

As described above, the volumes RT, vol1-vol5 are linked into the global namespace 312 (see FIG. 3b) by a number of junctions. Information pertaining to each of these junctions is stored as an entry in a junction table maintained by the VLDB. Specifically, each entry of the junction table includes information pertaining to a mounting relationship defined by a parent volume, a child volume, and a respective junction. For example, for the volume vol4, the junction table stores a junction entry including information pertaining to the mounting relationship defined by the parent volume vol3, the child volume vol4, and the junction in the parent volume vol3 leading to the child volume vol4. Similarly, for the volume vol5, the junction table stores a junction entry including information pertaining to the mounting relationship defined by the parent volume vol3, the child volume vol5, and the junction in the parent volume vol3 leading to the child volume vol5. Each of these junctions, which are identified by their inode and generation numbers, functions as an internal mount point in the parent volume vol3 for the child volumes vol4, vol5. Each of the volumes RT, vol1-vol5 in the global namespace 312 can include one or more junctions, each corresponding to an entry in the junction table.

Accordingly, in the event one of the client system 204.1-204.2 (see FIG. 2) transmits, to one of the nodes 208.1-208.3, an NFS or CIFS request including an object name that corresponds to a junction, the N-module on that node uses the inode and generation number of that junction to index into the junction table, which maps the junction into the MSID of the associated child volume. For example, if the client system transmits a client request to a server node that includes an object name corresponding to the junction leading to the volume vol4, then the N-module on that node queries the junction table to find the MSID of the volume vol4. Next, the N-module indexes into the volume table using the MSID of the volume vol4 to find the DSID of the volume vol4. The N-module then uses the DSID of the volume vol4 to lookup the IP address of the D-module associated with the aggregate storing the volume vol4, and communicates with the D-module to access, using the DSID of the volume vol4, the volume data requested by the client system. The N-module then exports the requested volume data to the client system in an NFS or CIFS response.

C. Storage Server System Employing Extended Global Namespace

Figure 4:
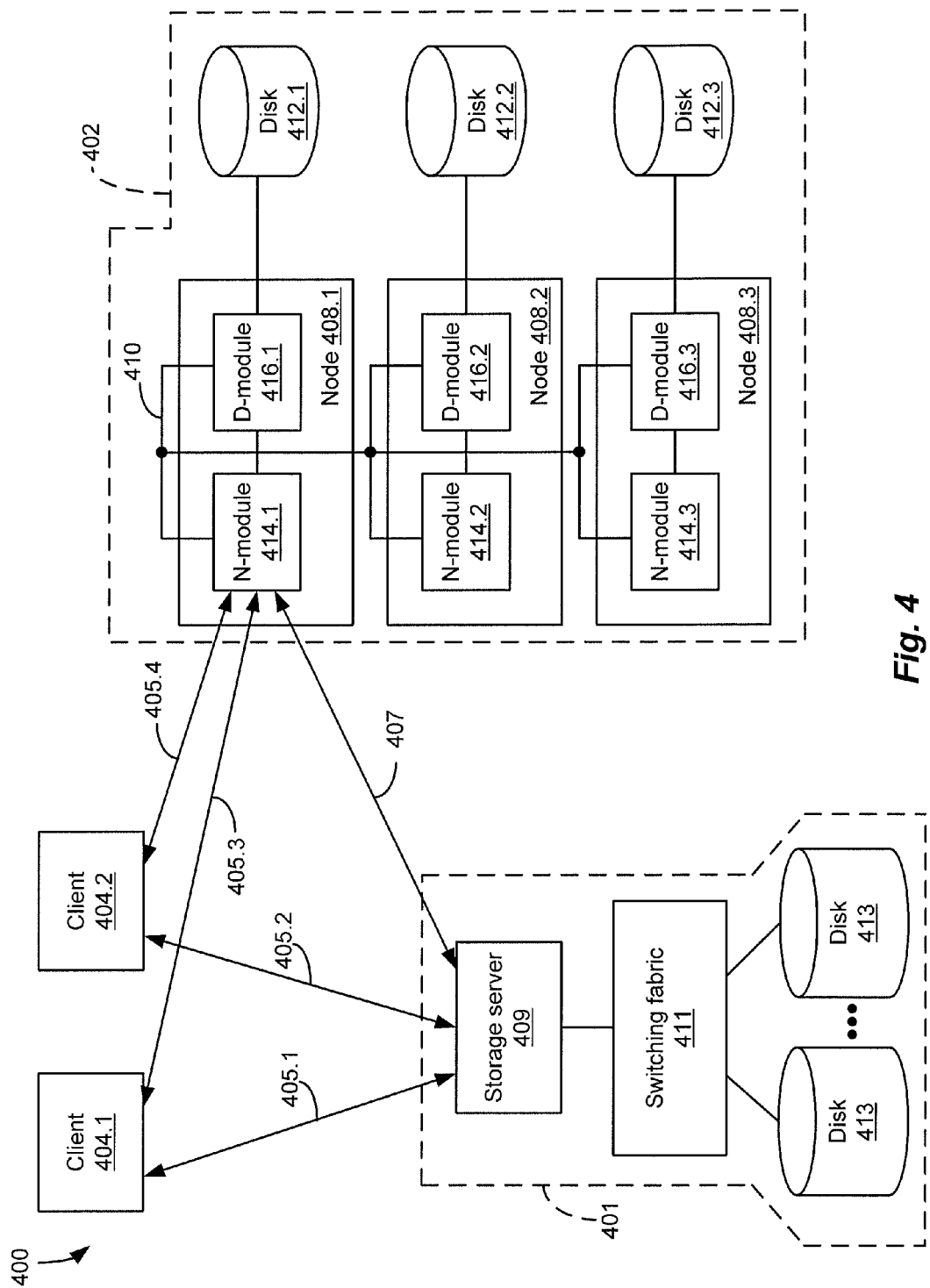
FIG. 4 is a block diagram of a network data storage environment including a clustered storage server system and at least one remote storage server, according to the present invention.

FIG. 4 depicts an illustrative embodiment of a network data storage environment 400, including a storage server system 401 and a clustered storage server system 402, in accordance with the present invention. The network data storage environment 400 provides users of the storage server system 401 with the ability to gain the advantages of the clustered storage server system 402, in which volumes from multiple server nodes are linked into a virtual global hierarchical namespace, without first having to migrate their data from the storage server system 401 to the clustered storage server system 402. In the clustered storage server system 402, the global namespace is extended to allow access to one or more remote volumes stored within the storage server system 401 over one or more network pathways disposed between the clustered storage server system 402 and the storage server system 401.

As shown in FIG. 4, the network data storage environment 400 includes a plurality of client systems 404.1-404.2, a plurality of network pathways 405.1-405.4 disposed between the client systems 404.1-404.2, the storage server system 401, and the clustered storage server system 402, and at least one network pathway 407 disposed between the storage server system 401 and the clustered storage server system 402. Like the storage server system 102 (see FIG. 1), the storage server system 401 includes a storage server 409, at least one mass storage device such as a disk 413, and a switching fabric 411 interconnecting the storage server 409 and the disk 413. For example, the client systems 404.1-404.2 are communicably connectable to the storage server 409 over the network pathways 405.1-405.2, respectively. The clustered storage server system 402 includes a plurality of server nodes 408.1-408.3, a cluster switching fabric 410, and a plurality of mass storage devices such as disks 412.1-412.3. Each of the client systems 404.1-404.2 is communicably connectable to each one of the nodes 408.1-408.3 over a suitable network pathway. For example, the client systems 401.1-401.2 are connectable to the node 408.1 over the network pathways 405.3-405.4, respectively. Each of the plurality of nodes 408.1-408.3 is configured to include an N-module, a D-module, and an M-host, each of which can be implemented as a software module. It is noted that FIG. 4 depicts only the N-module and the D-module within each of the nodes 408.1, 408.3 for clarity of illustration.

Specifically, the node 408.1 includes an N-module 414.1 and a D-module 416.1, the node 408.2 includes an N-module 414.2 and a D-module 416.2, and the node 408.3 includes an N-module 414.3 and a D-module 416.3. The N-modules 414.1-414.3 include functionality that enables the respective nodes 408.1-408.3 to connect to one or more of the client systems 404.1-404.2 over suitable network pathways, while the D-modules 416.1-416.3 connect to the disks 412.1-412.3, respectively. The M-hosts (not shown) provide management functions for the clustered storage server system 402. Each of the plurality of server nodes 408.1-408.3 in the clustered storage server arrangement therefore provides the functionality of a storage server. The clustered system 402 is also communicably connectable to the storage server system 401 via the network pathway 407. It is noted that a switched virtualization layer including a plurality of VIFs is provided below the interface between the respective N-modules 414.1-414.3 and the client systems 404.1-404.2. It is further noted that the clustered storage server system 402 can be organized into any suitable number of virtual servers (vservers).

Although the network data storage environment 400 of FIG. 4 includes the two client systems 404.1-404.2, the storage server system 401 including the single storage server 409, and the clustered storage server system 402 including the three nodes 408.1-408.3, it is understood that any suitable numbers of client systems, storage servers, server nodes, vservers, and/or virtual storage servers may be employed. It is also understood that, in alternative embodiments, the clustered storage server system 402 may include a plurality of N-modules and a plurality of D-modules interconnected in a configuration that does not reflect a one-to-one correspondence between the N-modules and D-modules. The clustered storage server system 402 can include the NETAPP® DATA ONTAP® storage operating system, available from NetApp, Inc., that implements the WAFL® storage system, or any other suitable storage operating system.

As described above, the network data storage environment 400 of FIG. 4 provides users of the storage server system 401 with the ability to gain the advantages of the clustered storage server system 402, in which volumes stored on the disks 412.1-412.3 are linked into a virtual global hierarchical namespace, without first having to migrate their data from the storage server system 401 to the clustered storage server system 402. In one embodiment, the global namespace of the clustered storage server system 402 is extended to allow the client systems 404.1-404.2 to access volumes stored on the disk 413 of the remote storage server 409 (or a virtual storage server) by transmitting a client request, such as a Network File System version 3 Protocol (NFSv3) request, for data to one of the nodes 408.1-408.3 within the clustered system 402, such as the node 408.1, which accesses the requested data over the network pathway 407 to the remote storage server 409, and issues an NFSv3 response containing the requested data over the appropriate network pathway 405.3, 405.4 to the client system. In effect, the server node of the clustered system 402 functions as an intermediary between the client systems 404.1-404.2 and the remote storage server 409, when one of the client systems 404.1-404.2 transmits an NFSv3 request to that node for data on a volume of the remote storage server 409. In one embodiment, an affiliation between a volume of the remote storage server 409 and the clustered system 402 is established via the extended global namespace within the context of a virtual server. It is understood that the client systems 404.1-404.2 can also access volumes of the remote storage server 409 (or a virtual storage server) directly over the network pathways 405.1-405.2, respectively, in a conventional manner.

Figure 5A:
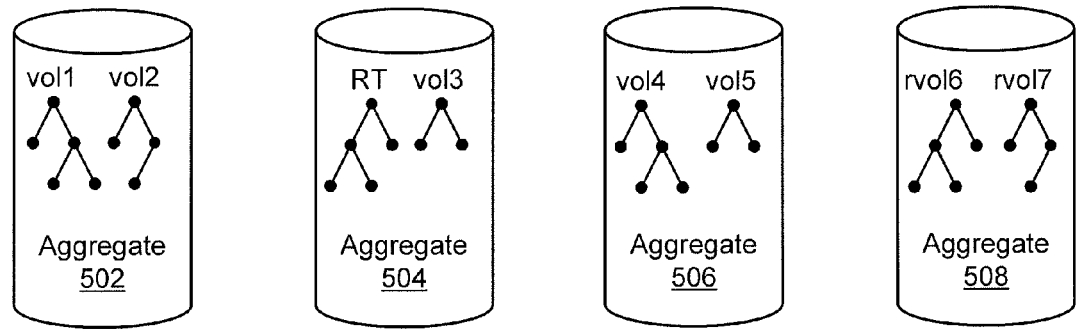
FIG. 5a is a diagram illustrating three exemplary aggregates included in the clustered storage server system of FIG. 4, and one exemplary aggregate of the remote storage server of FIG. 4.

The operation of a server node within the clustered storage server system 402 as an intermediary between the client systems 404.1-404.2 and the storage server 409 will be better understood with reference to the discussion below and FIGS. 5a-5e. FIG. 5a depicts four exemplary aggregates 502, 504, 506, 508. The aggregates 502, 504, 506 can be stored on one or more of the disks 412.1-412.3 of the clustered storage server system 402, and the aggregate 508 can be stored on one or more of the disks 413 of the storage server system 401. Like the aggregates 302, 304, 306 of FIG. 3a, each of the aggregates 502, 504, 506, 508 of FIG. 5a contains two representative volumes, in which each volume comprises a storage system subtree. Specifically, the aggregate 502 contains two volumes vol1, vol2, the aggregate 504 contains two volumes RT, vol3, the aggregate 506 contains two volumes vol4, vol5, and the aggregate 508 contains two volumes rvol6, rvol7.

Figure 5B:
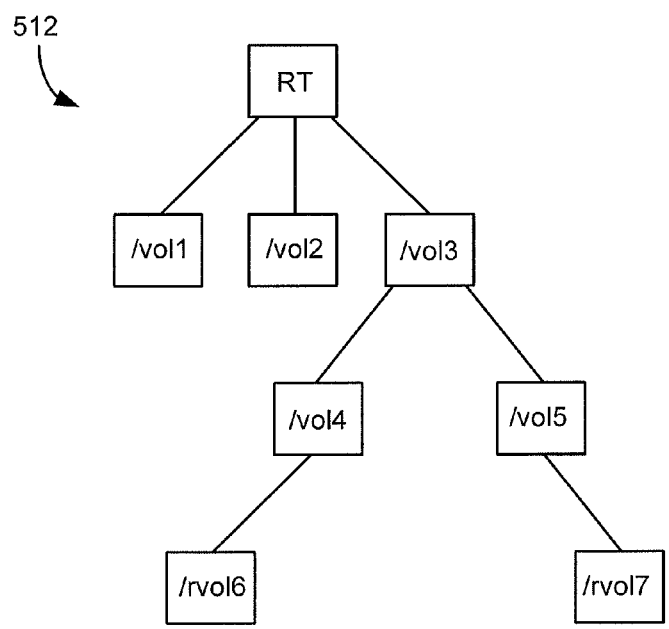
FIG. 5b is a diagram illustrating an extended virtual global hierarchical namespace composed of a plurality of volumes stored on the clustered storage server system and on the remote storage server of FIG. 4.

FIG. 5b depicts an exemplary virtual global hierarchical namespace 512 composed of the volumes RT, vol1, vol2, vol3, vol4, vol5, rvol6, rvol7. The global namespace 512 of FIG. 5b is like the global namespace 312 of FIG. 3b with the exception that the global namespace 512 is extended to allow the client systems 404.1-404.2 to access the volumes RT, vol1, vol2, vol3, vol4, vol5 contained in the aggregates 502, 504, 506 stored on the clustered storage server system 402, and the volumes rvol6, rvol7 contained in the aggregate 508 stored on the remote storage server 409. The volumes vol1, vol2, vol3, vol4, vol5, rvol6, rvol7 are linked into the global namespace 512 through junctions. From the perspective of a client system, each junction appears as a normal directory in the global namespace 512 exported by the clustered system 402. For example, in the global namespace 512, the volume RT (i.e., the root volume) has three junctions linking the root volume to the volumes vol1, vol2, vol3, and the volume vol3 has two junctions linking the volume vol3 to the volumes vol4, vol5. Further, in the global namespace 512, the volume vol4 has one junction linking the volume vol4 to the volume rvol6, and the volume vol5 has one junction linking the volume vol5 to the volume rvol7.

Figure 5C:
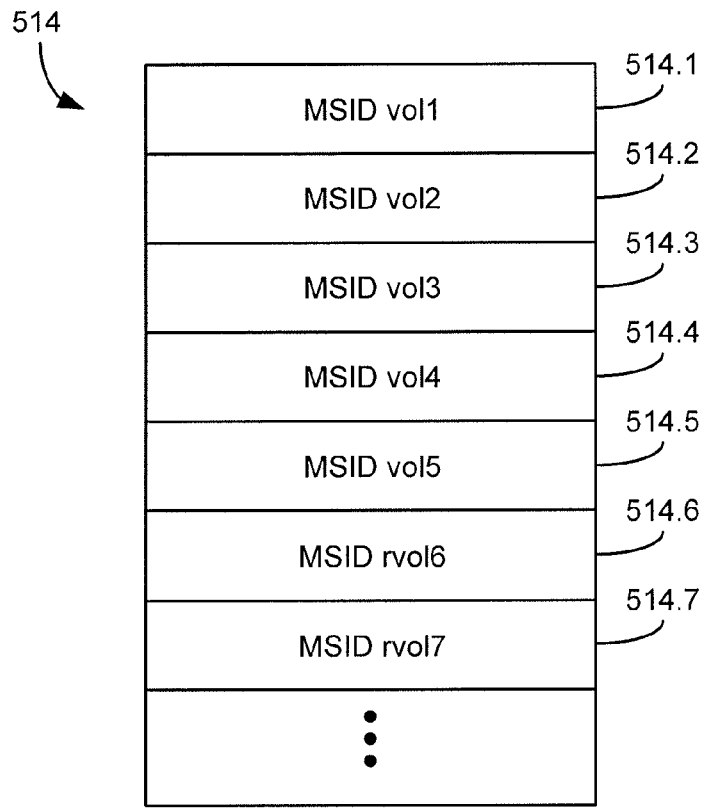
FIG. 5c is a junction table containing entries for junctions corresponding to internal mount points for the volumes linked into the extended global namespace of FIG. 5b.

Information pertaining to each junction is stored as an entry in a junction table 514, as depicted in FIG. 5c. The junction table 514 is maintained by the VLDB. Specifically, each entry of the junction table 514 corresponds to a mounting relationship defined by a parent volume, a child volume, and a respective junction acting as an internal mount point for the child volume. For example, for the volume vol1, the junction table 514 stores a first entry 514.1 corresponding to the mounting relationship defined by the parent volume RT, the child volume vol1, and the junction in the parent volume RT leading to the child volume vol1. Similarly, the junction table 514 stores second and third entries 514.2, 514.3 corresponding to the mounting relationships for the volumes vol2, vol3. Further, for the volume vol4, the junction table 514 stores a fourth entry 514.4 corresponding to the mounting relationship defined by the parent volume vol3, the child volume vol4, and the junction in the parent volume vol3 leading to the child volume vol4. Similarly, the junction table 514 stores a fifth entry 514.5 corresponding to the mounting relationship for the volume vol5. Moreover, for the volume rvol6, the junction table 514 stores a sixth entry 514.6 corresponding to the mounting relationship defined by the parent volume vol4, the child volume rvol6, and the junction in the parent volume vol4 leading to the child volume rvol6. Similarly, for the volume rvol7, the junction table 514 stores a seventh entry 514.7 corresponding to the mounting relationship defined by the parent volume vol5, the child volume rvol7, and the junction in the parent volume vol5 leading to the child volume rvol7. As shown in FIG. 5c, each of the entries 514.1-514.7 of the junction table 514 includes the MSID of the associated child volume.

Figure 5D:
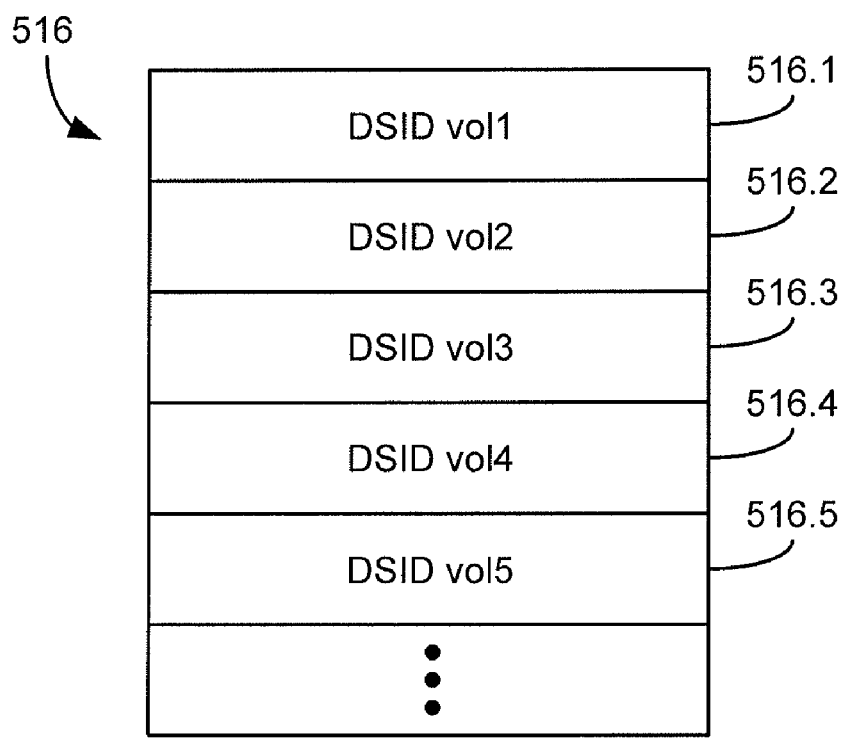
FIG. 5d is a volume table containing entries for volumes of the clustered storage server system of FIG. 4.
Figure 5E:
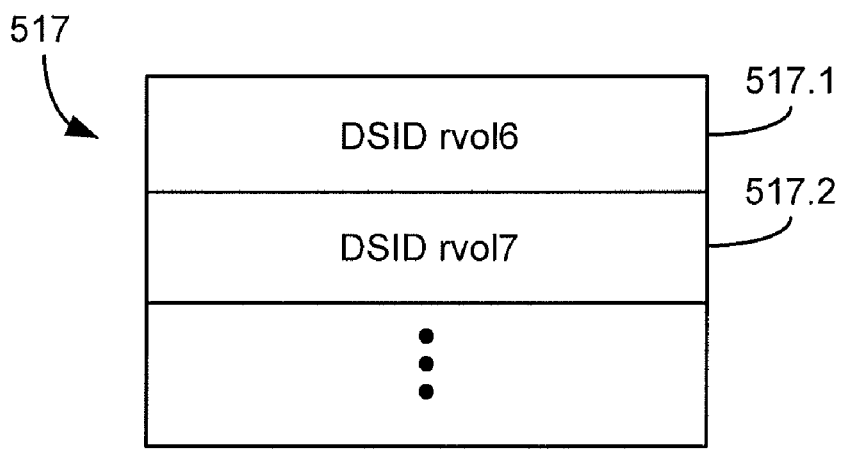
FIG. 5e is a volume table containing entries for volumes of the remote storage server of FIG. 4.

In addition, information pertaining to the mapping of each respective MSID of a volume into a corresponding Data Set Identifier (DSID) is stored as an entry in either a volume table 516, as depicted in FIG. 5d, or a volume table 517, as depicted in FIG. 5e. In the presently disclosed embodiment, each entry of the volume table 516 maps the MSID into one or more DSIDs of respective volumes of the clustered storage server system 402, and each entry of the volume table 517 maps the MSID into one or more DSIDs of respective volumes of the storage server system 401. Each DSID uniquely specifies a copy of a single volume. As shown in FIG. 5d, each entry of the volume tables 516, 517 includes the DSID of the associated volume. For example, the volume table 516 stores a first entry 516.1 including the DSID associated with the volume vol1, a second entry 516.2 including the DSID associated with the volume vol2, a third entry 516.3 including the DSID associated with the volume vol3, a fourth entry 516.4 including the DSID associated with the volume vol4, and a fifth entry 516.5 including the DSID associated with the volume vol5. As shown in FIG. 5e, the volume table 517 stores a first entry 517.1 including the DSID associated with the volume rvol6, and a second entry 517.2 including the DSID associated with the volume rvol7.

It is noted that, on each of the plurality of nodes 408.1-408.3, the junction table 514 and the volume tables 516, 517 are stored in and maintained by a volume location database (VLDB). The VLDB also stores and maintains two additional tables, namely, a first table storing detailed identity and location information relating to each storage server of the storage server system 401 that is accessible via an intermediary node of the clustered storage server system 402 (e.g., a netbios name for a CIFS service, a network name for an NFS service, an identifying name for a corresponding intermediary node on the clustered system, and a node number for the intermediary node), and a second table storing detailed identity and location information relating to each volume of the remote storage server accessible via the intermediary node (e.g., the MSID and DSID of the volume, a CIFS share name for the remote storage server, and an NFS export name for the remote storage server). In one embodiment, an affiliation between the remote storage server 409 and the clustered system 402 is established via the extended global namespace, in which the remote storage server 409 is integrated into the clustered system 402 as a non-voting member.

For example, in the event a user of the client system 404.1 (see FIG. 4) wishes to access a data file stored on the volume rvol6 of the storage server 409, using the node 408.1 of the clustered storage server system 402 as an intermediary node, the client system 404.1 first mounts the global namespace 512. It is noted that each vserver within the clustered storage server system 402 can present its own independent namespace, each rooted at a separate root volume. Further, each vserver within the clustered system 402 can be accessed via one or more VIFs having one or more associated IP addresses, and the VIFs can migrate among the N-modules 414.1-414.3. Next, the client system 404.1 transmits, to the VIF on the N-module 414.1, an NFSv3 request for the data file stored on the volume rvol6. As the N-module 414.1 traverses the global namespace 512 to find the MSID of the volume rvol6, the N-module 414.1 encounters the junctions for the volumes vol3, vol4, and the junction for the volume rvol6. The N-module 414.1 indexes into the junction table 514, using the inode and generation numbers, to find the MSID of the volume rvol6 contained in the junction table entry 514.6. In addition, the N-module 414.1 indexes into the volume table 517, using the MSID of the volume rvol6, to find the DSID of the volume rvol6 contained in the volume table entry 517.1. The N-module 414.1 then communicates with the storage server 409 to access data on the volume rvol6, as requested by the client system 404.1.

Whereas the N-module 414.1 can communicate with the D-modules 416.1-416.3 using the internal SpinNP protocol, as described above with reference to the clustered storage server system 202 (see FIG. 2), the N-module 414.1 can communicate with the storage server 409 over the network pathway 407 using a forwarding-based protocol employing a tunneling approach (see section D below) to enable the proxying of NFSv3 and related locking requests through the node 408.1 serving as an intermediary, or a forwarding-based protocol employing a client mapping approach (see section E below) to map the client ID to a unique N-module port interfacing the N-module to the network pathway 407. It is noted that while the client mapping approach of the forwarding-based protocol requires persistent state information to be stored on an intermediate N-module or D-module of the clustered system, the tunneling approach of the forwarding-based protocol does not require storage of persistent state information. It is understood that each of the N-modules 414.2-414.3 can communicate with the storage server 409 over a network pathway using the forwarding-based protocol based on either the tunneling approach or the client mapping approach.

D. Forwarding-Based Protocol—Tunneling Approach

Figure 6:
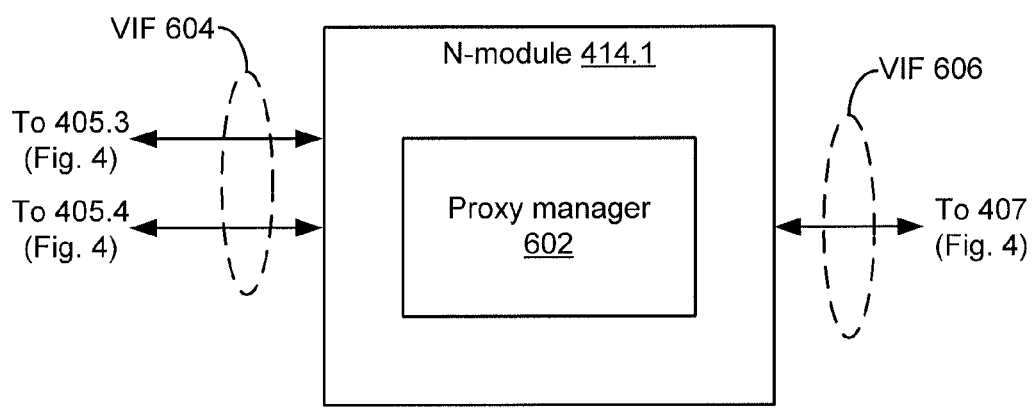
FIG. 6 depicts an N-module included in the clustered storage server system of FIG. 4, in which the N-module includes a proxy manager component for implementing a forwarding-based protocol for accessing a data file stored on a volume of the remote storage server of FIG. 4.

FIG. 6 depicts an illustrative embodiment of the N-module 414.1 included in the server node 408.1 within the clustered storage server system 402 (see FIG. 4). As shown in FIG. 6, the N-module 414.1 includes a proxy manager component 602, which is a software module operative to implement the forwarding-based protocol (tunneling approach or client mapping approach) for manipulating (i.e., reading or writing) data stored on a volume of the remote storage server 409. It is noted that each of the N-modules 414.1-414.3 of the server nodes 408.1-408.3, respectively, can include a proxy manager component for implementing the forwarding-based protocol.

Figure 7A:
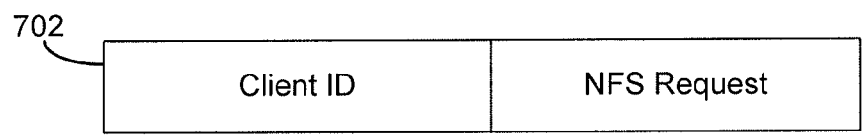
FIGS. 7a-7e illustrate a forwarding-based protocol employing a tunneling approach, which is implemented by the proxy manager of FIG. 6 for forwarding NFSv3 client requests from a clustered storage server system to a remote storage server.

In one embodiment, the N-module 414.1 communicates with the remote storage server 409 over the network pathway 407 using the tunneling approach of the forwarding-based protocol as follows. First, the N-module 414.1 receives a request from a client system (i.e., the client system 404.1 or 404.2) for reading data from or writing data to a data file stored on a volume of the storage server 409, according to the NFSv3 protocol. FIG. 7a depicts an exemplary NFSv3 client request 702, which is a Remote Procedure Call (RPC) including a Client ID and an NFS Request, i.e., a command to read data from or write data to the remote volume. In accordance with the NFSv3 protocol, the Client ID includes the client IP address and the client port number, and the NFS Request includes a transaction identifier (XID). The Client ID and XID uniquely identify the NFSv3 request 702. It is understood that the NFSv3 request 702 can also include a file handle for the data file that is compliant with the clustered storage server system 402. The file handle can include the MSID and the inode information corresponding to the remote volume. Next, the proxy manager 602 within the N-module 414.1 substitutes the file handle included in the client request with a new file handle that is compliant with the storage server 409. To that end, the proxy manager 602 employs the MSID and the inode information from the file handle supplied by the client system along with the corresponding file server identification (FSid) from the VLDB to generate the new file handle compliant with the storage server 409. The proxy manager 602 then generates a new NFSv3 request (referred to hereinafter as a "tunneled NFS request") to the storage server 409, passing the new file handle with the tunneled NFS request.

Figure 7B:
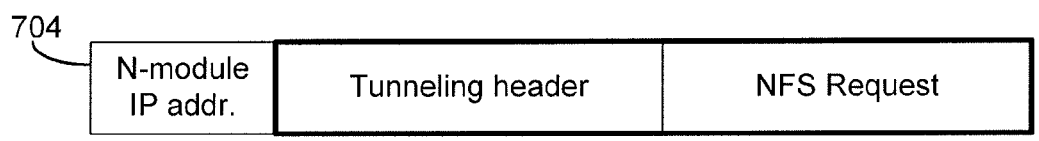

FIG. 7b depicts an exemplary tunneled NFS request 704, which includes an encapsulated Tunneling header and an encapsulated copy of the NFS Request. The tunneled NFS request 704 further includes the IP address and port number of the N-module as part of the communication protocol connection between the remote storage server 409 and the N-module 414.1. It is understood that each RPC request (and each RPC response) has an implicit source and destination port and IP address. In the tunneled NFS request 704, the Tunneling header includes the client IP address, the client port number, an identifier of the VIF through which the NFSv3 client request 702 was received (e.g., the IP address of the VIF 604 on the N-module 414.1), and authentication information for authenticating the client system. It is noted that because the tunneled NFS request 704 includes the original Client ID, no persistent state information is required to be stored on an intermediate N-module or D-module. The N-module 414.1 transmits or forwards, over the network pathway 407, the tunneled NFS request 704 to the storage server 409, which picks off the N-module IP address, and extracts the encapsulated Tunneling header, including the client IP address and port number, and the encapsulated NFS Request.

It is noted that the remote storage server 409 contains a replay cache for storing copies of non-idempotent data write requests received directly from the client systems 404.1-404.2 over the network pathways 405.1-405.2, respectively, and received via the intermediary node 408.1 of the clustered storage server system 402 over the network pathway 407. The replay cache of the storage server 409 can identify a data write request using the identity of the client system (the client IP address and port number), the transaction ID of the request (XID), the identity of the virtual storage server where the client request was received, and other characteristics of the request for verification (e.g., PROC, VER, checksum of the request). It is possible for a client system to re-transmit a request multiple times, for example, for the purpose of handling lost requests. In such situations, the replay cache will guarantee the idempotency of requests by identifying requests that have already been processed, and assuring that non-idempotent requests are executed only once.

Figure 7C:
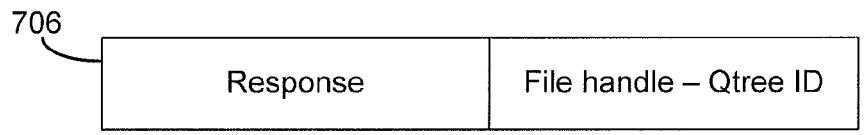

Next, the remote storage server 409 passes the extracted client ID (i.e., the client IP address and port number) and NFS Request to the NFSv3 layer of the storage server 409, and then to the WAFL layer of the storage server 409 to read data from or write data to the data file stored on the remote volume. The storage server 409 then generates an NFSv3 response. In the event the client request was a data read request, the NFSv3 response contains the requested data from the remote volume of the storage server 409. FIG. 7c depicts an exemplary NFSv3 response 706, which is an RPC including the Response. It is noted that the NFSv3 response 706 can also include one or more File handles compliant with the storage server 409, and that one or more of the File handles can optionally include a Qtree ID for identifying a sub-volume unit. A new NFSv3 response (referred to hereinafter as a "tunneled NFS response") to the N-module 414.1 is then generated, passing the File handle and the Qtree ID with the tunneled NFS response.

Figure 7D:
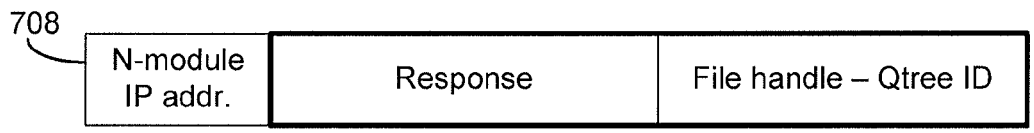

FIG. 7d depicts an exemplary tunneled NFS response 708, which includes an encapsulated copy of the Response, and optionally an encapsulated copy of the File handle/Qtree ID. The tunneled NFS response 708 further includes the IP address and port number of the N-module as part of the communication protocol connection between the remote storage server 409 and the N-module 414.1. The storage server 409 transmits, over the network pathway 407, the tunneled NFS response 708 to the N-module 414.1. Next, the proxy manager 602 within the N-module 414.1 extracts the Response from the encapsulated copy of the Response, and extracts the File handle/Qtree ID from the encapsulated copy of the File handle/Qtree ID. The proxy manager 602 then substitutes the File handle included in the tunneled NFS response 708 with a new file handle that is compliant with the clustered storage server system 402. To that end, the proxy manager 602 can employ the file server identification (FSid) information and the inode information from the File handle, the Qtree ID, and the MSID from the VLDB's volume table to generate the new file handle compliant with the clustered system 402.

Figure 7E:
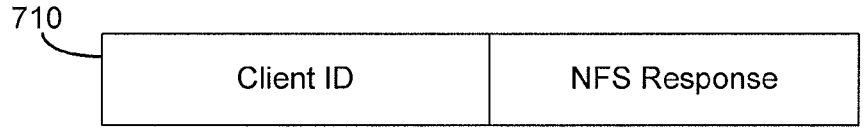

Next, the proxy manager 602 generates a response to the client system, passing the file handle of the clustered storage server system 402 with the response. FIG. 7e depicts an exemplary client response 710, which is an RPC including the Client ID (i.e., the client IP address and port number) and the NFS Response. Like the client request 702, the client response 710 is generated according to the NFSv3 protocol. The N-module 414.1 then transmits, over the appropriate network pathway 405.3-405.4, the client response 710 to the client system.

Figure 8A:
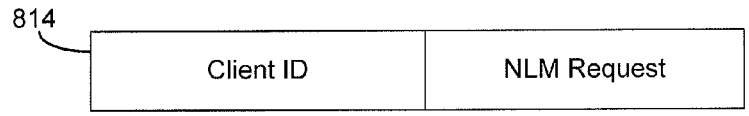
FIGS. 8a-8g illustrate a forwarding-based protocol employing a tunneling approach, which is implemented by the proxy manager of FIG. 6 for forwarding client lock requests from a clustered storage server system to a remote storage server.

It is noted that a client system can transmit, to one of the N-modules 414.1-414.3 such as the N-module 414.1, a Network Lock Manager (NLM) request for a lock on a data file stored on the remote storage server 409. In one embodiment, the N-module 414.1 communicates with the storage server 409 to forward such a client lock request over the network pathway 407 using the tunneling approach of the forwarding-based protocol as follows. First, the N-module 414.1 receives a client lock request from a client system, according to the NLM protocol. FIG. 8a depicts an exemplary client lock request (referred to as an "NLM request") 814, which is a Remote Procedure Call (RPC) including a Client ID and an NLM Request. As described above with reference to the NFSv3 client request 702, the Client ID includes the client IP address and the client port number.

Figure 8B:
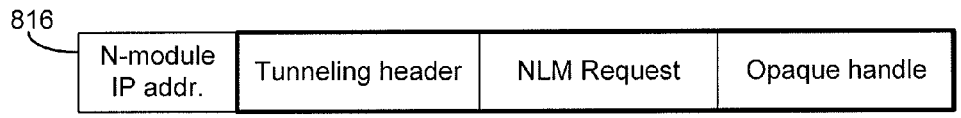

Upon receipt of the NLM request 814, the proxy manager 602 within the N-module 414.1 generates a new NLM request (referred to hereinafter as a "tunneled NLM request") to the remote storage server 409. FIG. 8b depicts an exemplary tunneled NLM request 816, which includes an encapsulated Tunneling header, an encapsulated copy of the NLM Request, and an optional encapsulated opaque handle for use in NLM callbacks from the storage server 409. In the tunneled NLM request 816, the Tunneling header can include the client IP address, the client port number, an identifier of the VIF through which the client request was received (e.g., the IP address of the VIF 604 on the N-module 414.1), and authentication information for authenticating the client system. It is noted that, like the NFSv3 client request 702, the NLM request 814 may optionally include a file handle (not shown) that is compliant with the clustered storage server system 402. The proxy manager 602 will replace any such file handle with a corresponding file handle identifying the file on, and compliant with, the storage server 409. To that end, the proxy manager 602 employs the MSID and the inode information from the file handle supplied by the client system along with the corresponding file server identification (FSid) from the VLDB to generate the new file handle compliant with the storage server 409. The tunneled NLM request 816 further includes the IP address and port number of the N-module as part of the communication protocol connection between the remote storage server 409 and the N-module 414.1. Next, the N-module 414.1 transmits or forwards, over the network pathway 407, the tunneled NLM request 816 to the storage server 409, which picks off the N-module IP address, and extracts the encapsulated Tunneling header, the NLM Request, and the optional Opaque handle. The Opaque handle contains information the N-module 414.1 needs to translate the file handle that is compliant with the storage server 409 back into a file handle that is compliant with the clustered system 402.

It is noted that the remote storage server 409 maintains a persistent monitor list within its NSM subsystem for storing a record of the IP address of the VIF (e.g., the VIF 606 on the N-module 414.1) through which the tunneled NLM request 816 was forwarded from the N-module 414.1 to the storage server 409, an identifier of the VIF (e.g., the IP address of the VIF 604 on the N-module 414.1) through which the NLM request 814 was received by the N-module 414.1 from the client system, and the identity of the client system (e.g., the name of the client system included in the NLM Request, and optionally the client IP address) seeking to acquire the lock.

Next, the remote storage server 409 passes the extracted Tunneling header information and NLM Request to the NLM subsystem of the storage server 409. It is noted that in trying to acquire a lock, the client NLM request can specify, if the lock is currently unavailable, whether to wait for the lock to become available (in the case of a blocking lock request) or whether to fail immediately (in the case of a non-blocking lock request). In the event the lock sought to be acquired by the client system is currently unavailable, a blocking lock request is queued within the storage server 409. If the blocking lock request is queued, then the storage server 409 will maintain the Opaque handle provided in the tunneled NLM request 816, as well as the identifier of the VIF through which the client request was received (e.g., the IP address of the VIF 604 on the N-module 414.1) extracted from the Tunneling header.

Figure 8C:
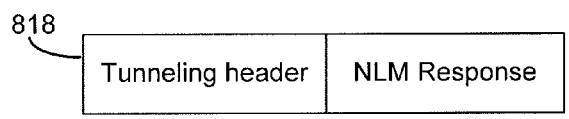
Figure 8D:
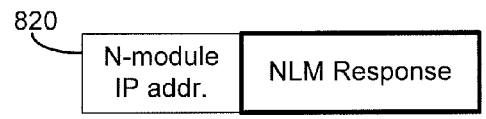
Figure 8E:

Whether the NLM request is granted, queued (in the case of a blocking lock request), or not granted (in the case of a non-blocking lock request), the remote storage server 409 generates an NLM response. FIG. 8c depicts an exemplary NLM response 818, which is an RPC including the NLM Response. A new NLM response (referred to hereinafter as a "tunneled NLM response") to the N-module 414.1 is then generated. FIG. 8d depicts an exemplary tunneled NLM response 820, which includes the encapsulated NLM response. The tunneled NLM response 820 further includes the IP address and port number of the N-module 414.1, as well as the IP address and port number of the remote storage server 409, as part of the communication protocol connection between the remote storage server 409 and the N-module 414.1. Next, the storage server 409 transmits, over the network pathway 407, the tunneled NLM response 820 to the N-module 414.1, which extracts the NLM response from the tunneled response 820. The proxy manager 602 within the N-module 414.1 then generates a response to the client system. FIG. 8e depicts an exemplary response 822, which is an RPC including the Client ID (i.e., the client IP address and port number) and the NLM Response. As in the NFS response 710, the proxy manager translates any included file handle from the storage server 409 to a file handle compliant with the clustered system 402. The N-module 414.1 transmits, over the appropriate network pathway 405.3-405.4, the NLM response 822 to the client system.

Figure 8F:
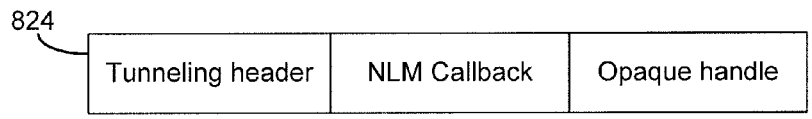
Figure 8G:
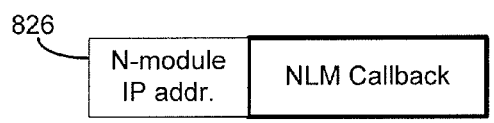

When the lock sought by a queued blocking lock request becomes available, the remote storage server 409 generates a server NLM RPC request (also referred to herein as an "NLM callback") to inform the client that its lock request is granted. In this case, the NLM callback is an "NLM_GRANTED callback". The NLM callback is encapsulated in a tunneled NLM callback 824, as depicted in FIG. 8f, which also includes the Tunneling header with the client IP address and the identifier of the VIF through which the client request was received (e.g., the IP address of the VIF 604 on the N-module 414.1), an Opaque handle, and the IP address of the storage server 409 as part of the communication protocol connection between the remote storage server 409 and the N-module 414.1. The VIF identifier and the Opaque handle correspond to those that were maintained with the queued blocking lock request. It is noted that the NLM callback can include a file handle that is compliant with the remote storage server 409. Next, the storage server 409 transmits, over the network pathway 407, the tunneled NLM callback 824 to the N-module 414.1, which extracts the Tunneling header, the NLM callback, and the Opaque handle. The N-module 414.1 then generates an NLM callback 826, as depicted in FIG. 8g, using the extracted NLM callback RPC request, and the IP address of the VIF 604 identified in the Tunneling header. As with the NLM response 822, the proxy manager translates any included file handle from the storage server 409 to a file handle compliant with the clustered system 402. The Opaque handle may be used by the N-module 414.1 to facilitate file handle translation from the format of the storage server 409 to the format of the N-module 414.1. The N-module 414.1 then transmits, over the appropriate network pathway 405.3-405.4, the NLM callback 826 to the client system. To acknowledge the NLM callback 826, the client system transmits a client NLM response (not shown) to the N-module 414.1. This client NLM response is an RPC like the NLM response 822 of FIG. 8e. After the N-module 414.1 receives this client NLM response from the client system, the N-module 414.1 forwards the client NLM response to the storage server 409 in a tunneled NLM response (not shown), which includes the encapsulated NLM response like the encapsulated part of the tunneled NLM response 820 of FIG. 8d.

In the event one of the D-modules 416.1-416.3 undergoes a system crash, that D-module may lose all of its lock data, but it maintains a persistent monitor list within its NSM subsystem including information identifying all of the client systems (e.g., the client systems 404.1-404.2) that have acquired locks for data files stored on that server node. When the D-module is re-booted during recovery from the crash, the D-module notifies all of the client systems on its persistent monitor list through the N-modules having the appropriate client facing VIFs that they must reclaim their locks. Such re-booting of a computer system generally involves restarting the computer system and reloading its operating system.

In a likewise fashion, if the remote storage server 409 undergoes a system crash, then that storage server 409 may lose all of its lock data, but it maintains a persistent monitor list within its NSM subsystem of all of the client systems that have acquired locks for data files stored on the storage server 409. When the remote storage server 409 is re-booted during recovery from the system crash, the client systems (e.g., the client systems 404.1-404.2) on the storage server's persistent monitor list can be notified to reclaim their locks by the storage server 409 directly (e.g., over one or both of the network pathways 405.1-405.2), or via the VIF on the N-module (e.g., the N-module 414.1, 414.2, or 414.3) through which the client system previously acquired its lock. The persistent monitor list maintained by the storage server 409 is therefore configured to store not only information identifying the client systems that have acquired locks for data files stored on the storage server 409, but also routing information specifying the VIF or VIFs (e.g., the VIF 604 on the N-module 414.1) through which the client systems acquired their locks. It is noted that, from the perspective of an NFS client system, each VIF on an N-module that the client system communicates with represents a separate NFS server. It is further noted that a client system may have previously acquired a lock for a data file stored on the storage server 409 over a network pathway directly interconnecting the client system and the storage server 409 (e.g., the network pathway 405.1 or 405.2) via a network interface having a distinct IP address on the storage server 409.

Figure 9:
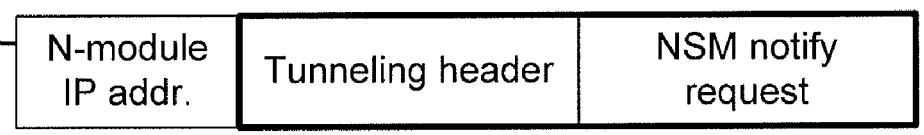
FIG. 9 illustrates the format of a tunneled notify request containing an encapsulated NSM notify request message that can be sent by a remote storage server to a client system via an intermediary node of a clustered storage server system.

The notification of the client systems on the persistent monitor list of the remote storage server 409 to reclaim their locks when the storage server 409 is re-booted will be better understood with reference to the following illustrative example and FIGS. 4, 6, and 9. In this example, it is assumed that each of the client systems 404.1, 404.2 can acquire a lock for a data file stored on the storage server 409 either directly over one of the network pathways 405.1, 405.2 interconnecting the client system 404.1, 404.2 and the storage server 409, or via one of the network pathways 405.3, 405.4 interconnecting the client system 404.1, 404.2 and the N-module 414.1. It is understood that each of the client systems 404.1, 404.2 may alternatively acquire a lock for a data file stored on the storage server 409 via a suitable network pathway interconnecting the client system 404.1, 404.2 and the N-module 414.2 or 414.3 of the clustered storage server system 402.

In this illustrative example, the remote storage server 409 is re-booted during recovery from a system crash. Next, for each network interface on the storage server 409 through which the client system 404.1 or 404.2 previously acquired its lock over the network pathway 405.1 or 405.2, the storage server 409 transmits one or more notify requests (e.g., one or more NSM SM_NOTIFY requests) to the client system 404.1, 404.2 via the respective network interface over the appropriate network pathway 405.1 or 405.2. In addition, for each VIF (e.g., the VIF 604) on the N-module 414.1 through which the client system 404.1 or 404.2 previously acquired its lock over the network pathway 405.3 or 405.4, the storage server 409 transmits a notify request (e.g., an NSM SM_NOTIFY request) intended for the client system 404.1, 404.2 encapsulated in a tunneled notify request to the VIF 606 on the N-module 414.1 over the network pathway 407. FIG. 9 depicts an exemplary tunneled notify request 924, which includes an encapsulated Tunneling header and an encapsulated NSM notify request. In the tunneled notify request 924, the Tunneling header can include the client IP address, an identifier of the VIF through which the original client lock request was received (e.g., the IP address of the VIF 604 on the N-module 414.1), and authentication information for authenticating the client system 404.1 or 404.2. The tunneled notify request 924 further includes the IP address and port number of the N-module as part of the communication protocol connection between the remote storage server 409 and the N-module 414.1.

Next, the N-module 414.1 extracts the encapsulated Tunneling header including the client IP address and the NSM Notify request from the tunneled notify request 924, and forwards the NSM notify request to the client system 404.1, 404.2 via the VIF 604 over the appropriate network pathway 405.3 or 405.4. To accomplish such encapsulated NSM notification, each time one of the client systems 404.1, 404.2 acquires its first lock via a VIF on one of the N-modules 414.1, 414.2, 414.3 for a data file stored on the remote storage server 409, the storage server 409 stores in its persistent monitor list the following routing information: information identifying the specific VIF (e.g., the VIF 604) on an N-module through which the client system can be reached over a network pathway (e.g., the network pathway 405.3 or 405.4) interconnecting the client system and the respective N-module, and the IP address of the VIF (e.g., the VIF 606 on the N-module 414.1) through which that respective N-module can be reached over a network pathway (e.g., the network pathway 407) interconnecting the storage server 409 and the respective N-module.

It is noted that the VIFs on a particular N-module (e.g., the VIFs 604, 606 on the N-module 414.1) can migrate from that N-module to one or more other N-modules (e.g., the N-module 414.2 and/or the N-module 414.3) of the clustered storage server system 402. In one embodiment, additional logic may be provided between the remote storage server 409 and each instance of the proxy manager 602 on the respective N-modules to allow the storage server 409 to determine the N-module to which a VIF interfacing with a client system (referred to herein as the "client-facing VIF") migrated, if it is not the same N-module to which the VIF interfacing with the storage server 409 (referred to herein as the "storage server-facing VIF") migrated. In an alternative embodiment, the respective N-module may incorporate a mechanism to forward NLM callbacks from the remote storage server to the appropriate N-module to which the client-facing VIF migrated.

Figure 10:
FIG. 10 illustrates the format of a tunneled lock response re-direct containing an encapsulated lock response re-direct message that can be sent by a node of a clustered storage server system to a remote storage server.

For example, if the client-facing VIF and the storage server-facing VIF were to migrate to different N-modules, then, in response to an NSM SM_NOTIFY request from the remote storage server 409, the N-module receiving the NSM SM_NOTIFY request can transmit a message (referred to herein as a "tunneled lock response re-direct message") to the storage server 409 containing a list of IP addresses of storage server-facing VIFs that may be associated with the N-module to which the client-facing VIF migrated. FIG. 10 depicts an exemplary tunneled lock response re-direct message 1028, which includes a Lock response re-direct message. The tunneled lock response re-direct message 1028 further includes the IP address and port number of the N-module as part of the communication protocol connection between the remote storage server 409 and the N-module. In response to receiving the lock response re-direct message, the storage server 409 can retransmit the NSM notify request to one or more of the storage server-facing VIF IP addresses listed in the lock response re-direct message until it locates the N-module to which the client-facing VIF migrated.

E. Forwarding-Based Protocol—Client Mapping Approach

Figure 11A:
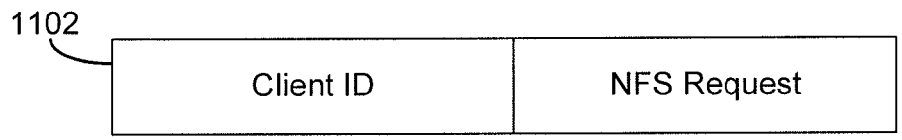
FIGS. 11a-11d illustrate a forwarding-based protocol employing a client mapping approach, which is implemented by the proxy manager of FIG. 6 for forwarding NFSv3 client requests from a clustered storage server system to a remote storage server.

In one embodiment, the N-module 414.1 can communicate with the remote storage server 409 over the network pathway 407 using the client mapping approach of the forwarding-based protocol as follows. It is noted that each of the N-modules 414.2-414.3 can communicate with the storage server 409 using the client mapping approach of the forwarding-based protocol in a similar fashion. First, the N-module 414.1 receives a request from a client system (i.e., the client system 404.1 or 404.2) for reading data from or writing data to a data file stored on a volume of the storage server 409, according to the NFSv3 protocol. FIG. 11a depicts an exemplary NFSv3 client request 1102, which is a Remote Procedure Call (RPC) including a Client ID and an NFS Request, i.e., a command to read data from or write data to the remote volume. The Client ID can include the client IP address and the client port number, and the NFS Request can include a transaction identifier (XID). The Client ID and XID uniquely identify the NFSv3 request. It is understood that the NFSv3 request 1102 can also include a file handle for the data file that is compliant with the clustered storage server system 402. The file handle can include the MSID and the inode information corresponding to the remote volume.

Next, the file handles included in the client request 1102 are substituted with new file handles that are compliant with the remote storage server 409. To that end, the MSID and the inode information from the file handle supplied by the client system as well as the corresponding FSid from the VLDB are used to generate the new file handle compliant with the storage server 409. In addition, to avoid possible ambiguity among multiple NFSv3 client requests received by the N-module 414.1, the Client ID is mapped to a unique port number of the N-module 414.1, thereby allowing the replay cache on the storage server 409 to respond properly, as described above in section D. To that end, the Client ID, which includes the client IP address and the client port number, is mapped from, e.g., the VIF 604 (see FIG. 6) interfacing the N-module 414.1 to the network pathways 405.3-405.4 to a suitable backend VIF, e.g., the VIF 606 (see FIG. 6) interfacing the N-module 414.1 to the network pathway 407 via a unique N-module port. This mapping of the Client ID from the VIF 604 to the VIF 606 can be stored in a client map on a designated volume in persistent storage within the clustered storage server system 402. Unlike the above-described tunneling approach of the forwarding-based protocol, the client mapping approach of the forwarding-based protocol requires persistent state information (i.e., the client map, and optionally the table of shadow locks described below in section G) to be stored on an intermediate N-module or D-module.

Figure 11B:
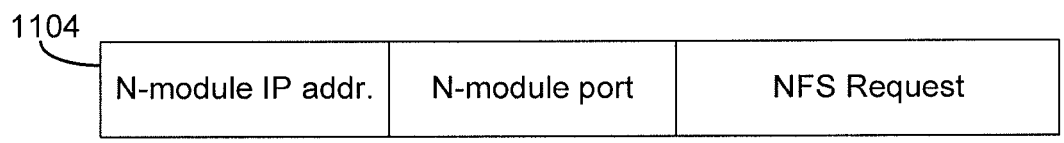

Next, a new NFSv3 client request is generated to the remote storage server 409, passing the new file handle compliant with the storage server 409 with the NFSv3 request. FIG. 11b depicts an exemplary NFS request 1104, which includes the unique N-module port number from the client map, and a copy of the NFS Request. The NFS request 1104 further includes the IP address and port number of the N-module as part of the communication protocol connection between the remote storage server 409 and the N-module 414.1. The N-module 414.1 transmits or forwards, over the network pathway 407, the NFS request 1104 to the storage server 409, which picks off the N-module IP address, and extracts the NFS Request. Next, the storage server 409 passes the NFS Request to the NFSv3 layer of the storage server 409, and then to the WAFL layer of the storage server 409 to read data from or write data to the data file stored on the remote volume.

Figure 11C:
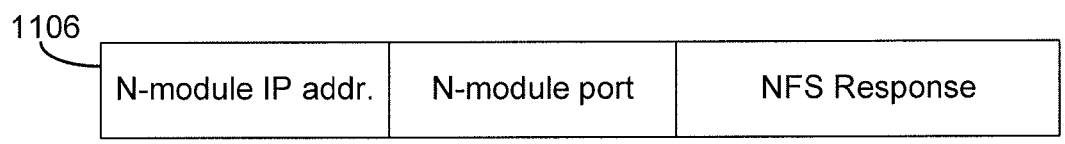
Figure 11D:

The remote storage server 409 then generates an NFSv3 response to the N-module 414.1. In the event the client request was a data read request, the NFSv3 response contains the requested data from the remote volume of the storage server 409. FIG. 11c depicts an exemplary NFSv3 response 1106, which is an RPC including the NFS Response. As shown in FIG. 11c, the NFSv3 response 1106 contains the unique N-module port number from the client map, and the NFS Response. The NFS response 1106 further includes the IP address and port number of the N-module as part of the communication protocol connection between the remote storage server 409 and the N-module 414.1. It is understood that the NFSv3 response 1106 can also include one or more File handles compliant with the storage server 409. The storage server 409 transmits, over the network pathway 407, the NFS response 1106 to the N-module 414.1. Next, each file handle included in the NFS response 1106 is substituted with a new file handle that is compliant with the clustered storage server system 402. To that end, the FSid information and the inode information from the file handle included in the NFS response 1106 as well as the corresponding MSID from the VLDB are can be employed to generate the new file handle compliant with the clustered system 402. In addition, the client map is queried, using the IP address of the backend VIF (e.g., the VIF 606 on the N-module 414.1) and the unique N-module port number included in the NFS response 1106, to find the corresponding Client ID information. Next, a client response is generated to the client system, passing the file handle of the clustered storage server system 402 with the response. FIG. 11d depicts an exemplary client response 1108, which is an RPC including the Client ID and the NFS Response. Like the client request 1102, the client response 1108 is generated according to the NFSv3 protocol. The N-module 414.1 then transmits, over the appropriate network pathway 405.3-405.4, the NFSv3 response 1108 to the client system.

F. Referral-Based Protocol

In the event the N-module 414.1 receives a client request for reading data from or writing data to a data file stored on a volume of the remote storage server 409 according to the Network File System version 4 Protocol (NFSv4) or CIFS protocol, the N-module 414.1 can use the referral feature of the NFSv4 or CIFS protocol to communicate with a client system, thereby re-directing the client request by issuing a re-direct directive to the client system. It is noted that in order to handle the re-direct directive issued by the N-module 414.1, the client system is configured to support NFSv4 or CIFS redirection.

Figure 12:
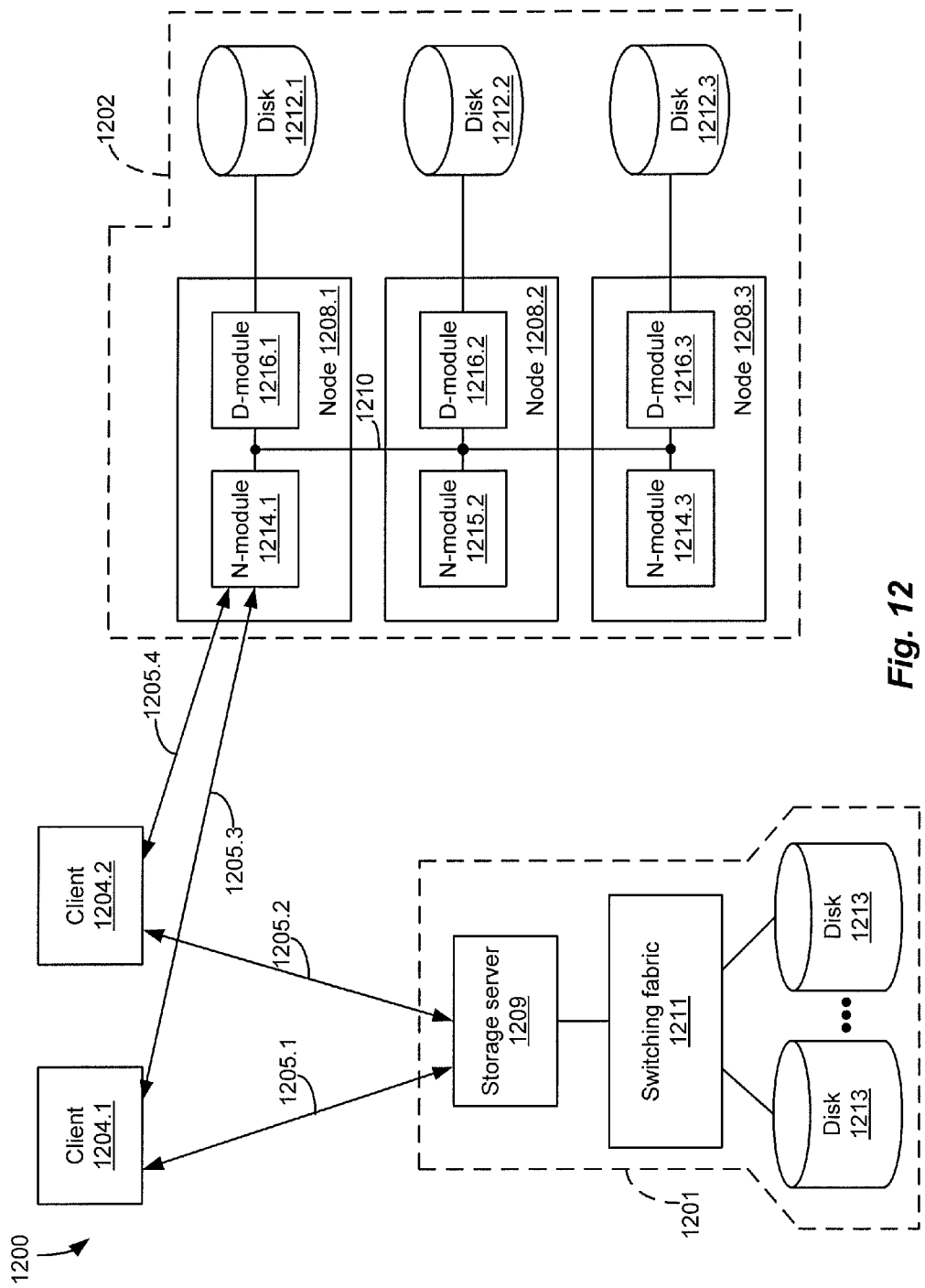
FIG. 12 is a block diagram of an alternative embodiment of a network data storage environment including a clustered storage server system and at least one remote storage server, according to the present invention.

FIG. 12 depicts an illustrative embodiment of a network data storage environment 1200, including a storage server system 1201 and a clustered storage server system 1202, in accordance with the present invention. Like the network data storage environment 400 (see FIG. 4), the network data storage environment 1200 provides users of the storage server system 1201 with the ability to gain the advantages of the clustered storage server system 1202, in which volumes from multiple server nodes are linked into a virtual global hierarchical namespace, without first having to migrate their data from the storage server system 1201 to the clustered storage server system 1202. However, the network data storage environment 1200 employs the referral-based protocol to perform redirection of NFSv4 or CIFS requests for manipulating (i.e., reading or writing) data on remote volumes stored on the storage server system 1201.

As depicted in FIG. 12, the network data storage environment 1200 includes a plurality of client systems 1204.1-1204.2, and a plurality of network pathways 1205.1-1205.4 disposed between the client systems 1204.1-1204.2, the storage server system 1201, and the clustered storage server system 1202. The storage server system 1201 includes a storage server 1209, at least one mass storage device such as a disk 1213, and a switching fabric 1211 interconnecting the storage server 1209 and the disk 1213. For example, the client systems 1204.1-1204.2 are communicably connectable to the storage server 1209 over the network pathways 1205.1-1205.2, respectively. The clustered storage server system 1202 includes a plurality of server nodes 1208.1-1208.3, a cluster switching fabric 1210, and a plurality of mass storage devices such as disks 1212.1-1212.3. Each of the client systems 1204.1-1204.2 is communicably connectable to each one of the nodes 1208.1-1208.3 over a suitable network pathway. For example, the client systems 1201.1-1201.2 are connectable to the node 1208.1 over the network pathways 1205.3-1205.4, respectively. Each of the plurality of nodes 1208.1-1208.3 is configured to include an N-module, a D-module, and an M-host, each of which can be implemented as a software module. It is noted that FIG. 12 depicts only the N-module and the D-module within each of the nodes 1208.1-1208.3 for clarity of illustration. It is further noted that a switched virtualization layer including a plurality of VIFs is provided below the interface between the respective N-modules 1214.1-1214.3 and the client systems 1204.1-1204.2, and that the clustered storage server system 1202 can be organized into any suitable number of virtual servers (vservers).

Figure 13A:
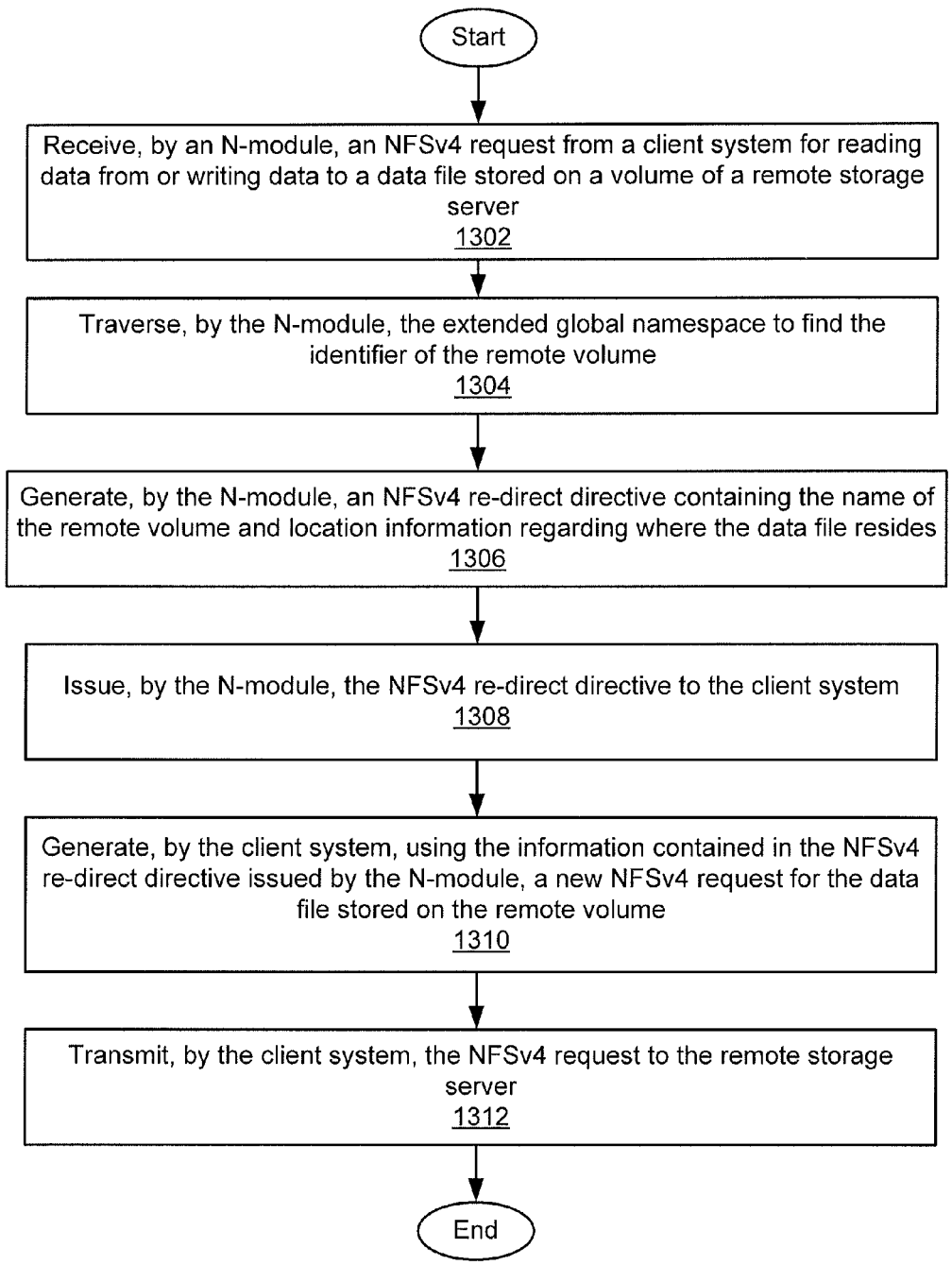
FIG. 13a is a flow diagram illustrating an exemplary method of performing redirection of an NFSv4 request, using a referral-based protocol.

In one embodiment, the network data storage environment 1200 employs the referral-based protocol to perform redirection of an NFSv4 request for manipulating data stored on a volume of the remote storage server 1209 as follows. In this exemplary embodiment, the names of a plurality of volumes RT, vol1, vol2, vol3, vol4, vol5 from the plurality of nodes 1208.1-1208.3, and the names of a plurality of volumes rvol6, rvol7 of the storage server 1209, are linked into an extended virtual global hierarchical namespace such as the extended global namespace 512 (see FIG. 5b). As depicted in step 1302 (see FIG. 13a), the N-module 1214.1 receives, over the network pathway 1205.3, a client request from the client system 1204.1 for reading data from or writing data to a data file stored on the volume rvol6 of the remote storage server 1209, according to the NFSv4 protocol. Next, as depicted in step 1304, the N-module 1214.1 traverses the extended global namespace 512 to find an identifier, specifically, the MSID/DSID, of the volume rvol6, consulting the junction and volume tables maintained by the VLDB, as appropriate. As depicted in step 1306, the N-module 1214.1 then generates an NFSv4 re-direct directive containing the name of the volume rvol6 and location information regarding where the data file on the volume rvol6 resides, as derived from the MSID/DSID of the volume rvol6. Next, as depicted in step 1308, the N-module 1214.1 issues the NFSv4 re-direct directive to the client system 1204.1 over the network pathway 1205.3. As depicted in step 1310, the client system 1204.1 then generates, using the information contained in the NFSv4 re-direct directive, a new NFSv4 request for the data file on the volume rvol6, and, as depicted in step 1312, transmits the NFSv4 request to the storage server 1209 over the network pathway 1205.1.

Figure 13B:
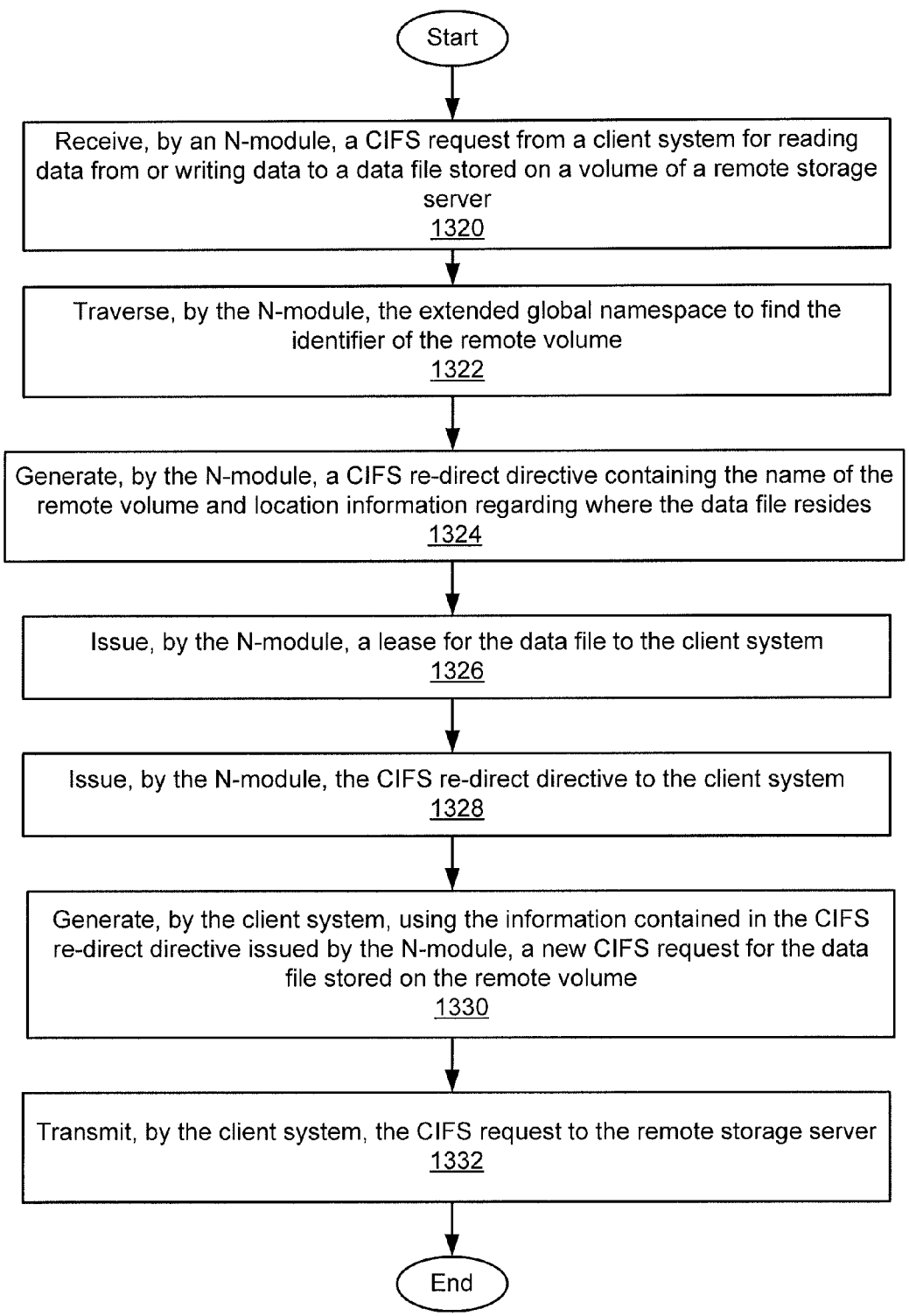
FIG. 13b is a flow diagram illustrating an exemplary method of performing redirection of a CIFS request, using the referral-based protocol.

In another embodiment, the network data storage environment 1200 employs the referral-based protocol to perform redirection of a CIFS request for manipulating data stored on a volume of the remote storage server 1209 as follows. In this exemplary embodiment, the names of the volumes RT, vol1, vol2, vol3, vol4, vol5 from the nodes 1208.1-1208.3, and the names of the volumes rvol6, rvol7 of the storage server 1209, are linked into the extended global namespace 512 (see FIG. 5b). As depicted in step 1320 (see FIG. 13b), the N-module 1214.1 receives, over the network pathway 1205.3, a client request from the client system 1204.1 for reading data from or writing data to a data file stored on the volume rvol6 of the storage server 1209, according to the CIFS protocol. In this exemplary embodiment, it is understood that the client system 1204.1 is a CIFS client having Distributed File System (DFS) capability. Next, as depicted in step 1322, the N-module 1214.1 traverses the extended global namespace 512 to find an identifier, specifically, the MSID/DSID, of the volume rvol6, consulting the junction and volume tables maintained by the VLDB, as appropriate. As depicted in step 1324, the N-module 1214.1 then generates a CIFS re-direct directive containing the name of the volume rvol6 and location information regarding where the data file on the volume rvol6 resides, as derived from the MSID/DSID of the volume rvol6. Next, as depicted in step 1326, the N-module 1214.1 issues the client system 1204.1 a lease for the data file, and, as depicted in step 1328, issues the CIFS re-direct directive to the client system 1204.1 over the network pathway 1205.3. As depicted in step 1330, the client system 1204.1 then generates, using the information contained in the CIFS re-direct directive, a new CIFS request for the data file on the remote volume rvol6, and, as depicted in step 1332, transmits the CIFS request to the storage server 1209 over the network pathway 1205.1. For the duration of the lease, the client system 1204.1 directly manipulates the data stored on the volume of the storage server 1209 over the network pathway 1205.1. It is noted that, in the event the lease expires, the client system 1204.1 can communicate with the N-module 1214.1 over the network pathway 1205.3 to renew the lease for the data file.

G. Shadow Locks

As described above, the forwarding-based protocol employing the tunneling approach enables the proxying of NFSv3 requests and related locking requests and releases through one of the server nodes of the clustered storage server system 402 (see FIG. 4) serving as an intermediary. To keep track of lock information relating to client lock requests and releases when the client mapping approach of the forwarding-based protocol is employed, the network data storage environment 400 (see FIG. 4) implements a lock shadowing technique.

By way of background, a lock for a resource may be mandatory and enforced by a storage server system, or advisory and not enforced by any storage server system. With respect to advisory locks, client applications can establish their own conventions regarding particular operations that may only be performed with certain locks held by the client applications. When adhered to by the client applications, these conventions seek to assure that no destructive interference arises between the respective client systems.

Problems can arise, however, when a network lock management (NLM) scheme employing advisory locks is implemented within the network data storage environment 400 (see FIG. 4). For example, as discussed above with reference to FIG. 4, the N-module 414.1 can receive, from the client system 404.1, a client request for a first data file stored on a remote volume of the remote storage server 409, according to the NFSv3 and Network Lock Manager (NLM) protocols. The client request can include a request to take an NLM lock "L1" on the first data file stored on the remote volume. The lock request from the client system 404.1 is identified by the IP address of the client system 404.1. In response to the client lock request, the N-module 414.1 transmits, to the storage server 409, a corresponding request to take the NLM lock L1 on the first data file over a suitable network pathway such as the network pathway 407. The lock request from the N-module 414.1 is identified by the IP address of the N-module 414.1. Similarly, the N-module 414.1 can also receive, from the client system 404.2, a client request for a second data file stored on a remote volume of the storage server 409, according to the NFSv3 and NLM protocols. The client request can include a request to take an NLM lock "L2" on the second data file stored on the remote volume. This lock request from the client system 404.2 is identified by the IP address of the client system 404.2. In response to the client lock request from the client system 404.2, the N-module 414.1 transmits, to the storage server 409, a corresponding request to take the NLM lock L2 on the second data file over the network pathway 407. Like the lock request corresponding to the client system 404.1, this second lock request from the N-module 414.1 is identified by the N-module IP address.

In the event the remote storage server 409 is re-booted (e.g., during recovery from a system crash), the respective NLM locks L1, L2 taken by the client systems 404.1-404.2 are dropped (i.e., the storage server 409 loses the lock state), and the storage server 409 issues at least one notification to the N-module 414.1 such as an NSM SM_NOTIFY request indicating that the NLM locks L1, L2 held by the N-module 414.1 on behalf of (but not in the name of) the client systems 404.1, 404.2 have been dropped. To be capable of notifying the client systems 404.1-404.2 that their locks L1, L2 have been dropped, the N-module 414.1 keeps track of which client systems hold locks on the storage server 409. Similarly, in the event one of the client systems 404.1-404.2, e.g., the client system 404.1, is re-booted (e.g., during a system crash recovery), the NLM lock L1 taken by the client system 404.1 needs to be released, and the client system 404.1 issues at least one notification to the N-module 414.1 such as an NSM SM_NOTIFY request indicating that the NLM lock L1 has been released. However, the N-module 414.1 does not forward the NSM SM_NOTIFY request from the client system 404.1 to the storage server 409, as the storage server 409 would then drop all of the NLM locks L1, L2 taken by the client systems 404.1-404.2. This is because, within the storage server 409, the lock requests corresponding to the NLM locks L1, L2 are identified by the N-module IP address, not the IP addresses of the respective client systems 404.1-404.2. Instead, the N-module 414.1 keeps track of which locks the client systems 404.1-404.2 hold on the storage server 409, and selectively transmits a lock release for the lock L1 held by the client system 404.1.

Unlike the above-described tunneling approach of the forwarding-based protocol, the client mapping approach of the forwarding-based protocol requires persistent lock information pertaining to lock requests and releases issued by the client systems 404.1-404.2 to be stored on an intermediate N-module or D-module. It is understood that any vserver within the clustered storage server system 402 can serve as an NLM proxy. Specifically, a vserver within the clustered system 402 serving as an NLM proxy keeps track of information pertaining to which one(s) of the client systems 404.1-404.2 holds locks on the remote storage server 409, and which files stored on volumes of the remote storage server 409 the client system has taken locks on. Such information is used by the NLM proxy when handling NSM SM_NOTIFY requests issued by the storage server 409 to the N-modules 414.1-414.3, and NSM SM_NOTIFY requests issued by the client systems 404.1-404.2 to the N-modules 414.1-414.3, allowing the NLM proxy to release the appropriate lock(s). Some of this information (e.g., the client map) requires persistent storage, such as the list of client systems that hold locks on one or more remote storage servers (e.g., the storage server 409) within the global namespace of the vserver, without necessarily specifying which client system is holding locks on which remote storage server.

In one embodiment, the network data storage environment 400 (see FIG. 4) is configured to implement the lock shadowing technique to store the lock information required in the client-mapping approach. The NLM proxy employs at least one shadow volume associated with at least one of the D-modules 416.1-416.3 to effectively shadow the lock operations performed on files stored on volumes of the remote storage server 409. The D-module associated with the shadow volume stores the shadow lock state in its general lock table. Each shadow volume corresponds to a remote volume containing a junction linking the remote volume into the extended global namespace of the clustered storage server system 402. Each lock held by the NLM proxy on the storage server 409 is effectively shadowed by a lock held in the name of the client system on a corresponding file number (inode number) on the corresponding shadow volume. The NLM proxy can release locks on a per-file basis, and therefore the shadow lock operations can be simplified by taking a single shared lock on an entire file, instead of implementing specific byte ranges and exclusivity for each lock operation of the storage server 409. Further, because the lock engine of the WAFL® storage system does not require a file to exist on the shadow volume to track locks for its inode number, the shadow volume can remain empty. It is noted that the shadow operations performed by the NLM proxy can be implemented using SpinNP locking primitives.

The shadow locking technique implemented within the network data storage environment 400 (see FIG. 4) will be better understood with reference to the following illustrative example. For each client locking request (blocking or non-blocking) received from the client systems 404.1-404.2, a vserver serving as an NLM proxy takes, using the same inode number as in the file handle contained in the request, a shared lock on a shadow volume, in addition to forwarding the lock request to the remote storage server 409 in the name of the client system. Because the shadow lock requests are always for a shared lock, they never fail, even if another client system is holding a lock on the same inode number. In response to an NSM SM_NOTIFY request received from one of the client systems 404.1-404.2, the NLM proxy determines whether the client system is holding locks on a volume of the remote storage server 409 by querying a lock database on the shadow volume. In the event the client system is holding locks on the remote volume, the NLM proxy finds all of the shadow volumes, each corresponding to a remote volume stored on the storage server 409, queries the lock database on each shadow volume to find the locks held on the remote volumes and the client systems 404.1-404.2 holding the locks, releases the corresponding locks on the shadow volumes, and transmits NSM SM_NOTIFY requests to all of the identified client systems.

In the event of a failure of a node currently serving as the NLM proxy, the NLM proxy can migrate and reinitialize itself on another one of the nodes 408.1-408.3. In the event of a VIF failover, the VIF can migrate to the N-module of another one of the nodes 408.1-408.3, and the NLM proxy can migrate and reinitialize itself on that same node. In the event the D-module storing the shadow lock state is re-booted (e.g., during recovery from a system crash), that D-module generally loses all of the lock information tracking which locks are held by the client systems, including shadow locks that correspond to locks on remote volumes. The D-module, however, retrieves a list, which is stored in persistent storage, of all client systems holding locks on any of its volumes. Because the shadow locks were requested in the name of the respective client systems, this list includes the client systems that held locks on any remote volumes associated with any shadow volume stored on the D-module. The D-module can then notify the appropriate N-module(s) 414.1-414.3, which, in turn, can issue one or more NSM SM_NOTIFY requests to one or more of the client systems 404.1-404.2. The respective client systems can then reclaim their locks by issuing locking requests, as described above. It is noted that this mechanism is the same regardless of whether the client systems 404.1-404.2 are holding locks on files stored on the clustered system 402 (e.g., on the volumes vol1, vol2 stored on the aggregate 502, on the volumes RT, vol3 stored on the aggregate 504, or on the volumes vol4, vol5 stored on the aggregate 506), on files stored on the remote storage server 409 (e.g., on the volumes rvol6 or rvol7 stored on the aggregate 508), or on files stored on both the clustered system 402 and the remote storage server 409.

H. VIF Pairing

As discussed above with reference to the forwarding-based protocol employing the tunneling approach, the VIF 604 (see FIG. 6) is provided at the interface between a respective N-module, e.g., the N-module 414.1 (see FIG. 4), and the network pathways 405.3-405.4, and the VIF 606 is provided at the interface between the respective N-module 414.1 and the network pathway 407. Further, as discussed above with reference to the forwarding-based protocol employing the client mapping approach, the proxy manager 602 included in the N-module 414.1 is configured to map a Client ID, including a client IP address and a client port number, from the front-end VIF 604 to the backend VIF 606 via a unique N-module port. In system configurations employing either the tunneling or client mapping approach of the forwarding-based protocol, the front-end VIF 604 and the back-end VIF 606 can be logically paired together, with each of the VIFs 604, 606 being bound to a different one of the ports on the same N-module 414.1. Such a pairing of the VIFs 604, 606 allows the full bandwidth of a single port of the storage server 409 to be achieved when employing the NFSv3 protocol. Such a VIF pairing also makes it possible to isolate data traffic between the clustered storage server system 402 and the storage server 409, by using dedicated ports on the clustered system 402 and the storage server 409 to isolate the data traffic on a secure network. In the event of a failure of the N-module 414.1, or a failover of one or more of the VIFs 604, 606 that are logically paired, the VIFs 604, 606 migrate together from the N-module 414.1 to the N-module of another one of the nodes 408.1-408.3, following the same failover rules, so long as the new N-module has a sufficient number of ports available to accommodate the two VIFs 604, 606.

As discussed above with reference to the tunneled NLM lock requests and the tunneled NSM SM_NOTIFY requests, additional logic may be provided to allow the remote storage server 409, in response to the failure of an N-module, to determine the N-module(s) to which the VIFs associated with the failed N-module migrated. In one embodiment, such additional logic would allow the storage server 409 to determine the N-module to which the client-facing VIF migrated, if it is not the same N-module to which the storage server-facing VIF migrated. Logically pairing the client-facing and storage server-facing VIFs, as described above, may obviate the need for such additional logic since the logically paired VIFs would migrate together to the same N-module in response to a failover condition. If these VIFs were not logically paired, then the respective VIFs may migrate to the same N-module or to different N-modules. Such logical pairing of the client-facing and storage server-facing VIFs may also obviate the need for an N-module receiving an NSM SM_NOTIFY request from a remote storage server to transmit a lock response re-direct message (see FIG. 10) to the remote storage server, following migration of the client-facing and storage server-facing VIFs from that N-module to another N-module.

I. Volume Migration

The network data storage environments 400, 900 (see FIGS. 4 and 12) allow the migration of volume data among the multiple server nodes within the clustered storage server system 402 and the storage server 409 within the storage server system 401, and among the multiple server nodes within the clustered storage server system 1202 and the storage server 1209 within the storage server system 1201. With regard to the network data storage environment 400, such migration of volume data is transparent to a client system, and is achieved using the above-described tunneling or client mapping approach of the forwarding-based protocol. Such migration of volume data can be performed using the SnapMirror facility, which is an automated storage system replication (duplication) facility of the NETAPP® DATA ONTAP® storage operating system, or any other suitable asynchronous mirroring technique. In the context of the present invention, such an asynchronous mirroring technique would be capable of preserving file handle information, thereby assuring that a file handle of a source volume will be identical to that of a destination volume. The SnapMirror facility is capable of preserving the file handle information, including file server identifications (FSids), inode numbers, snapshots and snapshot IDs (Snap IDs), and qtrees and qtree IDs.

In one embodiment, the SnapMirror facility is employed in the background to copy data from a source volume of the remote storage server to a destination volume within the clustered storage server system, while data traffic is being proxied through the indirection provided by one of the N-modules of the clustered system. Within the network data storage environment 400 in which the NFSv3 and Network Lock Manager (NLM) protocols are employed, when the copying is nearly completed, the N-module temporarily pauses the data traffic as the SnapMirror facility completes the remaining data transfer. Once the destination volume within the clustered system 402 is fully updated, the N-module resumes the data traffic, but forwards NFSv3 requests to the destination volume instead of the source volume. Within the network data storage environment 1200 in which the NFSv4 or CIFS protocol is employed, when the copying is nearly completed, the storage server 1209 temporarily pauses the data traffic as the SnapMirror facility completes the remaining data transfer. Once the destination volume within the clustered system 1202 is fully updated, in response to an NFSv4 or CIFS request, the storage server 1209 can issue a directive to the client system instructing it to send the NFSv4 or CIFS request to the N-module. Upon receipt of the client request, the N-module generates an NFSv4 or CIFS re-direct directive containing the name of the destination volume and information regarding where the data on the destination volume resides, and issues the NFSv4 or CIFS re-direct directive to the client system. In each case, the migration of volume data is performed on a per-mount, i.e., per-volume, basis.

Two illustrative methods of performing migration of volume data using the SnapMirror facility of the NETAPP® DATA ONTAP® storage operating system are described below with reference to FIGS. 4, 12, and 14a-14b. In each illustrative method, the migration of data from a source volume of the storage server system 401 (or 1201) to a destination volume of the clustered system 402 (or 1202) is performed using the SnapMirror facility. SnapMirror technology provides asynchronous mirroring of a data set between the storage server 409 (or 1209) and the clustered system 402 (or 1202), thereby enabling remote maintenance of consistent copies of the storage server's volume data on the clustered system.

Within the network data storage environment 400, one or more of the M-Hosts within the nodes 408.1-408.3 can include a job manager component, which is a software module operative to implement the migration of volume data using the SnapMirror facility. As depicted in step 1402 (see FIG. 14a), the job manager creates a destination volume on the clustered storage server system 402. For example, the destination volume may be created on one of the disks 412.1-412.3, e.g., the disk 412.1. At this stage, the destination volume is not accessible by any of the client systems 404.1-404.2. Next, the job manager initializes the SnapMirror facility of the DATA ONTAP® storage operating system, and the SnapMirror facility starts to copy data from the source volume of the storage server 409 to the destination volume on the disk 412.1, as depicted in step 1404, thereby updating data on the destination volume with the data of the source volume. For example, the source volume may reside on the disk 413 included in the storage server system 401. As depicted in step 1406, a determination is then made as to whether a predetermined amount of data updates of the destination volume data remain to be performed. If the remaining amount of data updates exceeds the predetermined amount, then step 1404 is repeated. Otherwise, if the remaining amount of data updates does not exceed the predetermined amount, then the job manager temporarily pauses the data traffic between the client systems 404.1-404.2, the storage server 409, and the clustered system 402, as depicted in step 1408. Next, the SnapMirror facility performs a final update of data from the source volume to the destination volume, as depicted in step 1410, thereby bringing the data on the destination volume up to the level of the data on the source volume. It is noted that the source volume of the storage server 409 is a remote volume that is linked into the extended global namespace of the clustered system 402 through a junction, which serves as an internal mount point in the global namespace for the source volume. Once the final data update is performed on the destination volume, the MSID of the junction linking the source volume into the global namespace is preserved, but it now points to the DSID of the destination volume, as depicted in step 1412. The migration of volume data within the network data storage environment 400 is now complete. One or more of the client systems 404.1-404.2 can then transparently access data on the destination volume on the disk 412.1 within the clustered system 402, as depicted in step 1414, using the same path names and file handles as before the migration.

Within the network data storage environment 1200, one or more of the M-Hosts within the nodes 1208.1-1208.3 can include a job manager component. As depicted in step 1422 (see FIG. 14b), the job manager creates a destination volume on the clustered storage server system 1202. For example, the destination volume may be created on one of the disks 1212.1-1212.3, e.g., the disk 1212.1. At this stage, the destination volume is not accessible by any of the client systems 1204.1-1204.2. Next, the job manager initializes the SnapMirror facility of the DATA ONTAP® storage operating system, and the SnapMirror facility starts to copy data from the source volume of the storage server 1209 to the destination volume on the disk 1212.1, as depicted in step 1424, thereby updating data on the destination volume with the data of the source volume. For example, the source volume may reside on the disk 1213 included in the storage server system 1201. As depicted in step 1426, a determination is then made as to whether a predetermined amount of data updates of the destination volume data remains to be performed. If the remaining amount of data updates exceeds the predetermined amount, then step 1424 is repeated. Otherwise, if the remaining amount of data updates does not exceed the predetermined amount, then the storage server 1209 temporarily pauses the data traffic between the client systems 1204.1-1204.2, the storage server 1209, and the clustered system 1202, as depicted in step 1428. It is noted that in step 1428, the pausing of the data traffic is supervised by a job manager on one of the M-Hosts within the nodes 1208.1-1208.3, but is implemented by the remote storage server 1209. Next, the SnapMirror facility performs a final update of data from the source volume to the destination volume, as depicted in step 1430, thereby bringing the data on the destination volume up to the level of the data on the source volume. Once the destination volume within the clustered system 1202 is fully updated, in response to an NFSv4 or CIFS request from one of the client systems 1204.1-1204.2, the storage server 1209 can issue a directive to the client system instructing it to send the NFSv4 or CIFS request to the N-module 1214.1. Upon receipt of the client request, the N-module 1214.1 generates an NFSv4 or CIFS re-direct directive containing the name of the destination volume and location information regarding where the data on the destination volume resides, and issues the NFSv4 or CIFS re-direct directive to the client system, as depicted in step 1432. It is noted that if the CIFS protocol is employed, then the client system can access the data of the destination volume for the duration of a lease. In the event the lease expires, the client system can transmit a new request to the N-module, and, upon receipt of the client request, the N-module can issue a new lease and a new re-direct directive to the client system. One or more of the client systems 1204.1-1204.2 can then access the data on the destination volume, as depicted in step 1434, via the clustered system 1202.

It is noted that when volume migration is performed within the network data storage environment 1200 using the CIFS protocol, the N-module 1214.1 issues a lease to the client system 1204.1, and the client system 1204.1 periodically re-validates its lease. During such volume migration using the CIFS protocol, the lease period is decreased to a specified time interval. Further, in step 1428 (see FIG. 14b), the storage server 1209 may temporarily pause the data traffic between the client systems 1204.1-1204.2, the storage server 1209, and the clustered system 1202 for a time interval longer than the specified interval of the lease, thereby causing the client systems 1204.1-1204.2 to lose access to the storage server system 1201. In one embodiment, the pausing of the data traffic in step 1428 is omitted when the CIFS protocol is employed. After the final update of data from the source volume to the destination volume is performed (see step 1430), the client system requests a new lease from the N-module 1214.1, which subsequently generates and issues the re-direct directive to the client system 1204.1 (see step 1432), and issues the new lease with a typical lease period to the client system 1204.1.

Figure 14A:
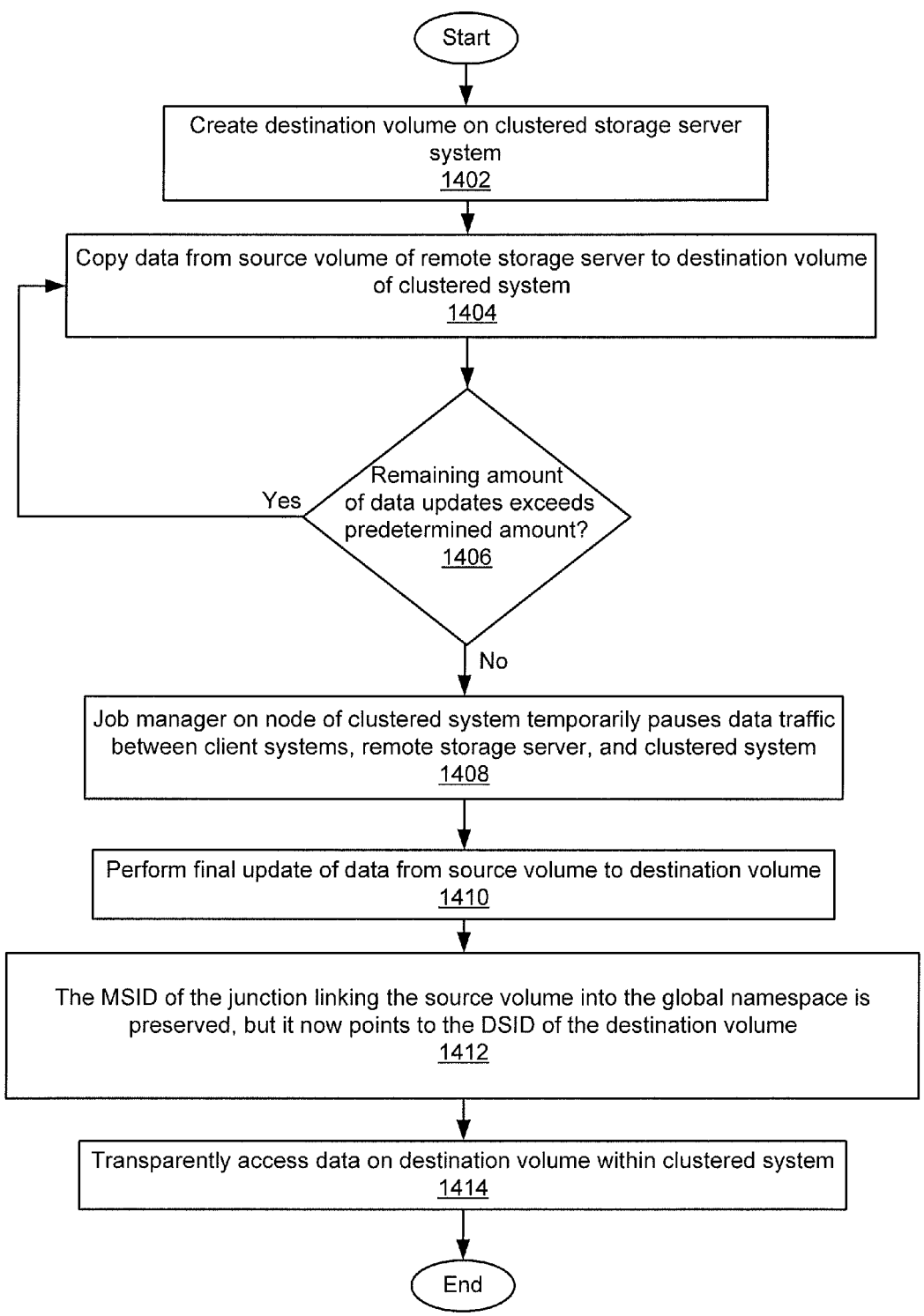
FIG. 14a is a flow diagram illustrating a method of performing transparent migration of volume data within the network data storage environment of FIG. 4.
Figure 14B:
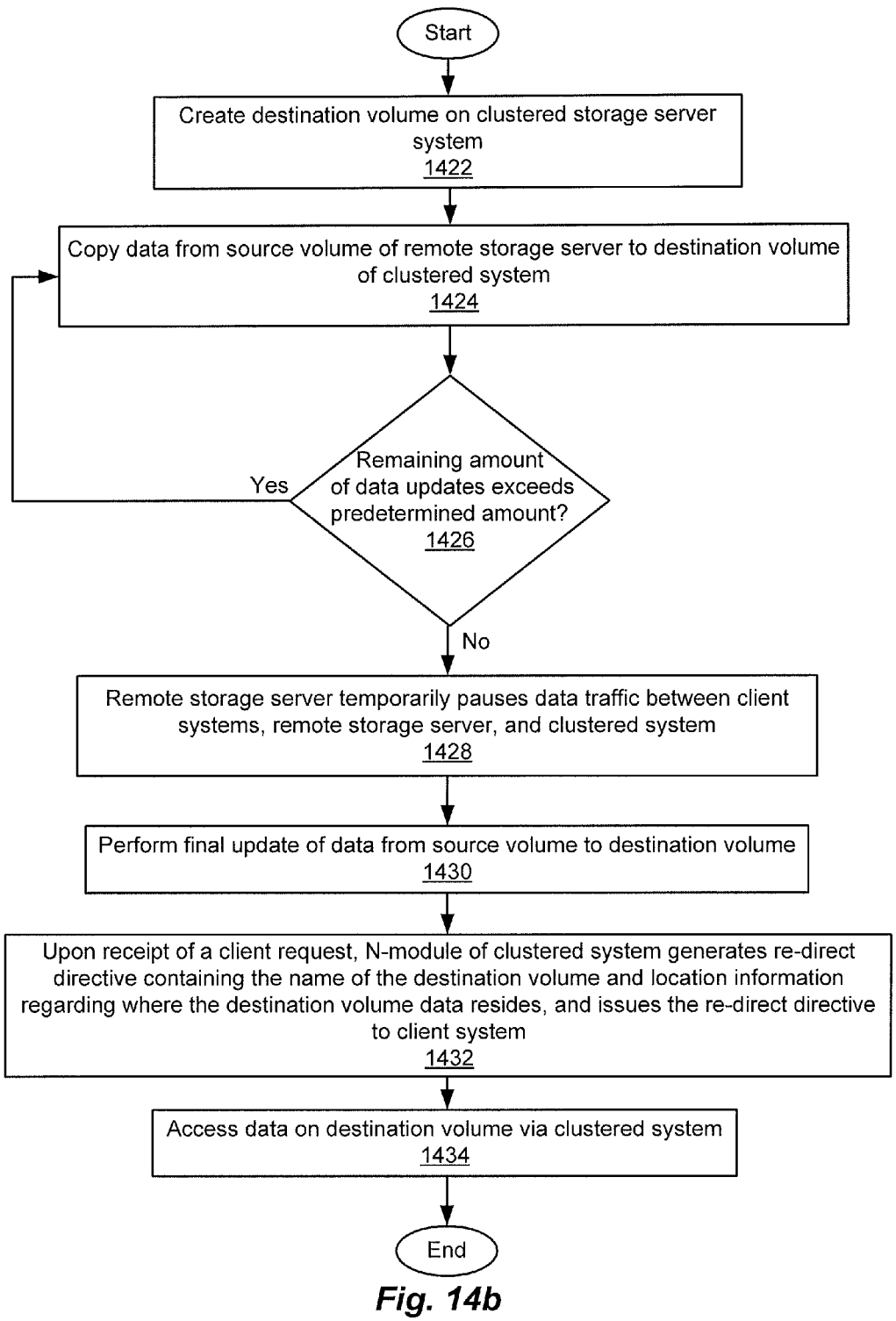
FIG. 14b is a flow diagram illustrating a method of performing transparent migration of volume data within the network data storage environment of FIG. 12.

Although each of the illustrative methods for performing volume migration depicted in FIGS. 14a-14b involve the migration of data from a source volume of the remote storage server system 401 (or 1201) to a destination volume of the clustered storage server system 402 (or 1202), it should be appreciated that such migration of data may alternatively be performed from a source volume of the clustered system 402 (or 1202) to a destination volume of the remote storage server system 401 (or 1201), or from a source volume of the remote storage server system 401 (or 1201) to a destination volume of another remote storage server system. With respect to the migration of data from one remote storage server system to another remote storage server system when the NFSv4 or CIFS protocol is employed, once the destination volume within the other remote system is fully updated, the client system transmits an NFSv4 or CIFS request to an N-module of the clustered storage server system, which generates an NFSv4 or CIFS re-direct directive containing the name of the destination volume and information regarding where the data on the destination volume resides on the other remote system, and issues the NFSv4 or CIFS re-direct directive to the client system. With respect to the migration of data from a remote storage server system to the clustered storage server system when the NFSv4 or CIFS protocol is employed, once the destination volume within the clustered system is fully updated, all subsequent client requests involving the destination volume are handled by the clustered system and are no longer re-directed.

It is noted that, in WAFL-based storage systems, the operations performed on volumes within the above-described illustrative embodiments are also applicable to qtree sub-volume units. In a WAFL-based system, a qtree is a predefined unit that is both administratively visible and externally addressable. Such a qtree corresponds to a subtree in a volume's storage system. Further, a volume can contain multiple qtrees. A qtree acts similarly to limits enforced on collections of data by the size of a partition in a traditional UNIX or Windows file system, but provides the ability to subsequently change the limits, as qtrees have no connection to a specific range of blocks on a physical disk. Unlike volumes, which are mapped to a particular collection of disks (e.g., a RAID group of disks) and act more like traditional partitions, qtrees are implemented at a higher level than volumes, and therefore provide increased flexibility.

As discussed above with reference to the tunneling approach of the forwarding-based protocol, the response generated by the remote storage server, e.g., the NFSv3 response 708 (see FIG. 7d), can include a File handle that is compliant with the remote storage server, including a Qtree ID for identifying a sub-volume unit. Upon receipt of the response generated by the remote storage server, the proxy manager within an N-module of the clustered storage server system can generate a new file handle that is compliant with the clustered system, using the FSid and the inode information from the file handle, the Qtree ID from the additional tunneling information, and the corresponding MSID from the volume table in the VLDB. It is noted that the response generated by the remote storage server can also include a Snap ID for identifying a snapshot, which is a persistent point in time image of an active storage system that enables quick data recovery after data has been corrupted, lost, or altered. Snapshots can be created by copying the data at predetermined points in time to form a consistent image. Snapshots can also be created virtually by using a pointer to form the image of the data. In addition, a snapshot can be used as a storage space-conservative mechanism, generally composed of read-only data structures, enabling a client system or system administrator to obtain a copy of all or a portion of the storage system as of a particular point in time when the snapshot was taken.

To assure non-disruptive data migration, the file handles generated by the proxy manager within an N-module of the clustered storage server system are configured to remain valid post migration. In one embodiment, this can be done by assigning a unique MSID to the file handle associated with each remote volume, each remote sub-volume unit (qtree), and each snapshot. With respect to a qtree, the proxy manager can detect the Qtree ID in the response generated by the remote storage server, and assign a unique MSID to the file handle associated with all files in that qtree. Further, subsequent file handles generated for the same qtree on the same volume will have the same MSID. Similarly, with respect to a snapshot, the proxy manager can detect the Snap ID in the response generated by the remote storage server, and assign a unique MSID to the file handle associated with all files in that snapshot. Subsequent file handles generated for the same snapshot on the same volume will then have the same MSID.

It is noted that each unique MSID assigned to the file handle associated with a remote volume, a qtree, and a snapshot will have a corresponding entry in the VLDB. In one embodiment, each remote volume can have up to 256 qtrees associated therewith, and up to 4995 snapshots associated therewith, thereby potentially requiring up to 256*4995 or 1,278,720 entries in the VLDB for that volume. To reduce the storage requirements for the VLDB, each unique MSID assigned to the file handle associated with a qtree or a snapshot can have a special entry in the VLDB that represents a range of values. For example, with respect to a qtree of a volume, the VLDB can have a single special entry that represents the range of values 0 to 256. With respect to a snapshot of a volume, the VLDB can have a single special entry that represents the range of values 0 to 4995. In this way, the total number of entries required in the VLDB can be reduced. Such special entries in the VLDB can be employed in conjunction with the above-described tunneling or client mapping approach of the forwarding-based protocol and the above-described referral-based protocol.

It is further noted that the operations performed by the above-described illustrative embodiments are purely exemplary and imply no particular order. Further, the operations can be used in any sequence when appropriate and can be partially used. With the above embodiments in mind, it should be understood that the present invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present invention are useful machine operations. The present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The present invention can also be embodied as computer readable code on a computer readable medium. The computer readable medium is any data storage device that can store data, which can be thereafter be read by a computer system. Examples of the computer readable medium include hard drives accessible via Network Attached Storage (NAS), Storage Area Networks (SAN), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in computer farms.

It will be appreciated by those of ordinary skill in the art that modifications to and variations of the above-described system and method of remote volume access and migration via a clustered server namespace may be made without departing from the inventive concepts disclosed herein. Accordingly, the invention should not be viewed as limited except as by the scope and spirit of the appended claims.

What is claimed is:

1. A method of accessing data on a volume of a remote storage server via an extended global namespace of volumes of a cluster of storage servers, comprising:
providing a global namespace of volumes of said cluster of storage servers, each of said volumes of said cluster of storage servers being linked into said global namespace via a junction corresponding to an internal mount point in said global namespace for a respective one of said volumes of said cluster of storage servers;
receiving, at one of said storage servers of said cluster of storage servers, at least one request from at least one client regarding data on at least one volume of said remote storage server, the client request including a volume identifier for the respective remote storage server volume,
wherein said global namespace is extended to include the volume of said remote storage server, the volume of said remote storage server being linked into the extended global namespace via a junction corresponding to an internal mount point in the extended global namespace for the volume of said remote storage server;
querying, by said one of said storage servers of said cluster of storage servers using the volume identifier for the remote storage server volume, at least one database to obtain location information for the remote storage server volume, said location information being associated with said internal mount point in the extended global namespace for the remote storage server volume;
locating the remote storage server volume using said location information obtained from the database; and accessing data associated with the located remote storage server volume.

2. The method of claim 1 wherein said receiving of the request from the client regarding data on the volume of said remote storage server includes receiving a request from the client for reading data from or writing data to the remote storage server volume, and receiving a client identifier in association with the request.

3. The method of claim 2 wherein said client identifier includes one or more of an IP address and a port number associated with said client.

4. The method of claim 2 wherein said receiving of the request from the client for reading data from or writing data to the remote storage server volume includes receiving a request from the client for reading data from or writing data to a data file stored on the remote storage server volume.

5. The method of claim 4 wherein the request received from the client includes a file handle for said data file that is compliant with said cluster of storage servers.

6. The method of claim 5 further including replacing said file handle included in the request with a file handle that is compliant with said remote storage server.

7. The method of claim 2:
wherein said accessing of data associated with the located remote storage server includes generating a tunneled request for reading data from or writing data to the remote storage server volume;
wherein said tunneled request includes an encapsulated tunneling header and an encapsulated copy of the request from the client for the reading data from or writing data to the remote storage server volume; and
wherein said encapsulated tunneling header includes the client identifier.

8. The method of claim 7 wherein said accessing of data associated with the located remote storage server further includes forwarding, by said one of said storage servers of said cluster of storage servers, said tunneled request to said remote storage server.

9. The method of claim 8:
wherein said accessing of data associated with the located remote storage server further includes receiving, at said one of said storage servers of said cluster of storage servers, a tunneled response from said remote storage server;
wherein said tunneled response includes an encapsulated copy of a response to the request from the client for reading data from or writing data to the remote storage server volume.

10. The method of claim 9 wherein said accessing of data associated with the located remote storage server further includes extracting, at said one of said storage servers of said cluster of storage servers, the response to the request from the client from said encapsulated copy of said response.

11. The method of claim 10:
further including generating, at said one of said storage servers of said cluster of storage servers, a response for subsequent transmission to the client;
wherein said response for subsequent transmission to the client comprises the response extracted from said encapsulated copy of said response.

12. The method of claim 11 further including transmitting, to the client by said one of said storage servers of said cluster of storage servers via a virtual interface through which the request from the client was received, said response including the extracted response, and said client identifier in association with said response.

13. The method of claim 9 wherein said receiving of the request from the client for reading data from or writing data to the remote storage server volume includes receiving a request from the client for reading data from or writing data to a data file stored on the remote storage server volume.

14. The method of claim 13 wherein said response to the request from the client includes a file handle for said data file that is compliant with said remote storage server.

15. The method of claim 14 further including replacing said file handle included in said response with a file handle that is compliant with said cluster of storage servers.

16. The method of claim 2 further including mapping said client identifier to a unique port number of said one of said storage servers of said cluster of storage servers.

17. The method of claim 16 wherein said mapping of said client identifier to said unique port number includes mapping said client identifier from an identifier of a virtual interface, referred to as a client-facing VIF, through which the client request was received by said one of said storage servers of said cluster of storage servers, to an identifier of virtual interface, referred to as a remote storage server-facing VIF, interfacing said one of said storage servers of said cluster of storage servers to said remote storage server via said unique port number.

18. The method of claim 17 further including storing, in a client map, said mapping of said client identifier to said unique port number of said one of said storage servers of said cluster of storage servers, said client map being stored in a persistent storage within said cluster of storage servers.

19. The method of claim 18 wherein said accessing of data associated with the located remote storage server includes generating a client request including said unique port number and a copy of the request from the client for reading data from or writing data to the remote storage server volume.

20. The method of claim 19 wherein said accessing of data associated with the located remote storage server further includes forwarding, by said one of said storage servers of said cluster of storage servers, said client request including said unique port number and said copy of the request from the client to said remote storage server.

21. The method of claim 20:
wherein said accessing of data associated with the located remote storage server further includes receiving, at said one of said storage server further includes receiving, at said one of said storage servers of said cluster of storage servers, a response to the forwarded client request from said remote storage server;
wherein said response to the forwarded client request includes said unique port number of said one of said storage servers of said cluster of storage servers.

22. The method of claim 21 further including querying, using the identifier of said remote storage server-facing VIF and said unique port number of said one of said storage servers of said cluster of storage servers, said client map to obtain said client identifier.

23. The method of claim 22:
further including generating, at said one of said storage servers of said cluster of storage servers, a response for subsequent transmission to the client;
wherein said response for subsequent transmission to the client comprises said response to the forwarded client request and said client identifier obtained from said client map.

24. The method of claim 2 wherein said accessing of data associated with the located remote storage server includes generating a re-direct directive containing said location information obtained from the database.

25. The method of claim 24 further including transmitting, by said one of said storage servers of said cluster of storage servers, said re-direct directive to said client.

26. The method of claim 1 wherein said receiving of the request from the client regarding data on the volume of said remote storage server includes receiving, from the at least one client, at least one request for at least one lock on at least one data file stored on the at least one volume of said remote storage server, and receiving a client identifier in association with the respective client lock request.

27. The method of claim 26:
wherein said accessing of data associated with the located remote storage server includes generating at least one tunneled lock request;
wherein the tunneled lock request includes an encapsulated tunneling header and an encapsulated copy of the client lock request; and
wherein said encapsulated tunneling header includes said client identifier.

28. The method of claim 27 wherein said accessing of data associated with the located remotes storage server further includes forwarding, by said one of said storage servers of said cluster of storage servers, the tunneled lock request to said remote storage server.

29. The method of claim 28:
wherein said accessing of data associated with the located remote storage server further includes receiving, at said one of said storage servers of said cluster of storage servers, at least one tunneled response from said remote storage server;
wherein the tunneled response includes an encapsulated copy of a response to the client lock request.

30. The method of claim 29 wherein said accessing of data associated with the located remote storage server further includes extracting, at said one of said storage servers of said cluster of storage servers, said response to the client lock request from said encapsulated copy of said response.

31. The method of claim 30:
further including generating, at said one of said storage servers of said cluster of storage servers, a response for subsequent transmission to said client;
wherein said response for subsequent transmission to said client comprises the response to the client lock request extracted from said encapsulated copy of said response.

32. The method of claim 31 further including transmitting, by said one of said storage servers of said cluster of storage servers to said client, said response comprising the extracted response to the client lock request, and said client identifier in association with said response.

33. The method of claim 28 further including storing, on said remote storage server in a persistent monitor list, a record of an identifier of a virtual interface, referred to as a client-facing VIF, through which each client lock request was received by a respective one of said storage servers of said cluster of storage servers, and a record of an identifier of a virtual interface, referred to as a remote storage server-facing VIF, through which each tunneled lock request was forwarded by the respective one of said storage servers of said cluster of storage servers to said remote storage server.

34. The method of claim 33 further including, in the event said remote storage is re-booted during recovery from a system crash:
querying said persistent monitor list to identify said client-facing VIF through which each client lock request was received by a respective one of said storage servers of said cluster of storage servers;
querying said persistent monitor list to identify a corresponding remote storage server-facing VIF through which the tunneled lock request was forwarded by the respective one of said storage servers of said cluster of storage servers to said remote storage server; and
for each identified client-facing VIF, receiving, at a respective one of said storage servers of said cluster of storage servers via the identified corresponding remote storage server-facing VIF through which the tunneled lock request was previously forwarded, a tunneled notify request from said remote storage server.

35. The method of claim 34 wherein said tunneled notify request includes an encapsulated tunneling header, and an encapsulated copy of a notify request.

36. The method of claim 35 further including:
extracting, at the respective one of said storage servers of said cluster of storage servers, said notify request from said encapsulated copy of the notify request; and
forwarding, by the respective one of said storage servers of said cluster of storage servers, said notify request to the respective client via the identified client-facing VIF.

37. The method of claim 34 further including, in the event the identified client-facing VIF and the identified corresponding remote storage server-facing VIF migrate to different ones of said storage servers of said cluster of storage servers, transmitting, by the respective one of said storage servers of said cluster of storage servers in response to receipt of said tunneled notify request, a tunneled lock response re-direct message to said remote storage server.

38. The method of claim 37 wherein said tunneled lock response re-direct message includes a list of remote storage server-facing VIFs associated with one or more storage servers of said cluster of storage servers to which the corresponding identified client-facing VIF possibly migrated.

39. The method of claim 27 wherein the tunneled lock request further includes an encapsulated opaque handle for use in a callback message from said remote storage server in the event said at least one lock is currently unavailable.

40. The method of claim 39 further including, in the event the currently unavailable lock subsequently becomes available, receiving, at said one of said storage servers of said cluster of storage servers, said callback message from said remote storage server.

41. The method of claim 40:
wherein said callback message comprises at least one tunneled callback message; and
wherein the tunneled callback message includes a copy of the opaque handle and a copy of said callback message.

42. The method of claim 41 further including generating, at said one of said storage servers of said cluster of storage servers, a file handle for said data file that is compliant with said cluster of storage servers using the opaque handle.

43. The method of claim 40 further including transmitting, by said one of said storage servers of said cluster of storage servers, said callback message to said client.

44. The method of claim 43 further including receiving, at said one of said storage servers of said cluster of storage servers, a response to said callback message from said client.

45. The method of claim 44 further including transmitting, by said one of said storage servers of said cluster of storage servers, at least one tunneled response to said callback message, wherein the tunneled response includes an encapsulated copy of said response to said callback message received from said client.

46. The method of claim 16, wherein the lock request corresponds to at least one data storage entity stored on said remote storage server, said one of said storage servers having an associated lock manager, and further comprising:

forwarding, by said one of said storage servers, the lock request to said remote storage server to obtain the requested lock on the corresponding data storage entity;

obtaining, by said one of said storage servers using said associated lock manager, a lock on a corresponding shadow data storage entity, said corresponding shadow data storage entity being representative of the data storage entity stored on said remote storage server;

storing, by said one of said storage servers using said associated lock manager, lock information pertaining to said lock on said corresponding shadow data storage entity, wherein the stored lock information includes the client identifier, and an identifier for the corresponding data storage entity;

receiving, at said one of said storage servers, at least one notify request from said remote storage server, the notify request pertaining to at least one data storage entity stored on said remote storage server for which the client obtained a lock; and in response to the receipt of the notify request:

consulting the stored lock information to identify the data storage entity stored on said remote storage server for which the client obtained the lock, and to identify the client that obtained the lock on the data storage entity;

releasing the lock on the shadow data storage entity representative of the identified data storage entity; and transmitting a notify request to the identified client.

47. The method of claim 46 further including:

receiving, at said one of said storage servers, at least one notify request from the client;

consulting the stored lock information to identify at least one data storage entity stored on said remote storage server for which the client obtained at least one lock; and transmitting, by said one of said storage servers, at least one lock release to said remote storage server to release the lock obtained by the client on the identified data storage entity.

48. The method of claim 47 wherein the identified data storage entity is the at least one data file, and further including releasing the lock obtained by the client on a per-file basis.

49. The method of claim 46:

wherein the data storage entity stored on said remote storage server is the at least one data file having an associated file handle;

wherein the associated file handle is contained in the lock request; and wherein said obtaining of said lock on said corresponding shadow data storage entity includes obtaining a shared lock on the shadow data storage entity using the same file handle contained in the lock request.

50. The method of claim 46 wherein said receiving, said forwarding, said obtaining, said storing, said consulting, said releasing, and said transmitting are performed by a proxy component disposed on said one of said storage servers.

51. The method of claim 50 further including, in the event of a failure of said one of said storage servers, migrating said proxy component from said one of said storage servers to another one of said cluster of storage servers.

52. The method of claim 51 wherein said receiving, and said forwarding are each performed via a virtual interface on said one of said storage servers and further including, in the event of a failure of said virtual interface, migrating said virtual interface from said one of said storage servers to said another one of said cluster of storage servers to which said proxy component migrated.

53. The method of claim 1:

wherein said receiving of said at least one request from said at least one client is performed via a first virtual interface, referred to as a client-facing VIF, on said one of said storage servers of said cluster of storage servers; and wherein said accessing of said data associated with the located remote storage server volume is performed via a second virtual interface, referred to as a remote storage server-facing VIF, on said one of said storage servers of said cluster of storage servers.

54. The method of claim 53 further including logically pairing said client-facing VIF and said remote storage server-facing VIF on said one of said storage servers of said cluster of storage servers.

55. The method of claim 54 further including, in the event of a failure of one or more of said client-facing VIF, said remote storage server-facing VIF, and said one of said storage servers of said cluster of storage servers, migrating the logically-paired client-facing VIF and remote storage server-facing VIF together to another one of said storage servers of said cluster of storage servers.

56. A system for accessing data on a volume of a remote storage server via an extended global namespace of volumes of a cluster of storage servers, comprising:

a cluster of storage servers;

wherein each of a plurality of volumes of said cluster of storage servers is linked into a global namespace via a junction corresponding to an internal mount point in said global namespace for a respective one of said volumes of said cluster of storage servers;

at least one remote storage server;

wherein said global namespace is extended to include at least one volume of said remote storage server, the volume of said remote storage server being linked into the extended global namespace via a junction corresponding to an internal mount point in the extended global namespace for the volume of said remote storage server;

wherein at least one storage server of said cluster of storage servers is operative:

to receive at least one request from at least one client regarding data on at least one volume of said remote storage server, the client request including a volume identifier for the respective remote storage server volume;

to query, using the volume identifier for the remote storage server volume, at least one database to obtain location information for the remote storage server volume, said location information being associated with said internal mount point in the extended global namespace for the remote storage server volume;

to locate the remote storage server volume using said location information obtained from the database; and to access data associated with the located remote storage server volume.

57. The system of claim 56 wherein said at least one storage server has an associated lock manager; and wherein said at least one storage server is further operative:
- to receive at least one lock request from at least one client to access at least one corresponding data storage entity, the corresponding data storage entity being stored on said remote storage server;
- to forward the lock request to said remote storage server to obtain the requested lock on the corresponding data storage entity;
- to obtain, using said associated lock manager, a lock on a corresponding shadow data storage entity, said corresponding shadow data storage entity being representative of the data storage entity stored on said remote storage server;
- to store, using said associated lock manager, lock information pertaining to said lock on said corresponding shadow data storage entity, wherein the stored lock information includes an identifier for the client obtaining the lock on the corresponding data storage entity, and an identifier for the corresponding data storage entity;
- to receive at least one notify request from said remote storage server, the notify request pertaining to at least one data storage entity stored on said remote storage server for which the client obtained a lock; and
- in response to the receipt of the notify request, to consult the stored lock information to identify the data storage entity stored on said remote storage server for which the client obtained the lock and to identify the client that obtained the lock on the data storage entity, to release the lock on the shadow data storage entity representative of the identified data storage entity, and to transmit a notify request to the identified client.

* * * * *